(12) United States Patent
Srivastava et al.

(10) Patent No.: US 10,931,698 B2
(45) Date of Patent: Feb. 23, 2021

(54) NETWORK THREAT DETECTION AND MANAGEMENT SYSTEM BASED ON USER BEHAVIOR INFORMATION

(71) Applicant: Verizon Patent and Licensing Inc., Arlington, VA (US)

(72) Inventors: Ashok N. Srivastava, Mountain View, CA (US); Santanu Das, San Jose, CA (US); Hai Shao, Fremont, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/531,218

(22) Filed: Aug. 5, 2019

(65) Prior Publication Data
US 2019/0356689 A1 Nov. 21, 2019

Related U.S. Application Data

(63) Continuation of application No. 14/635,158, filed on Mar. 2, 2015, now Pat. No. 10,412,106.

(51) Int. Cl.
*H04L 29/06* (2006.01)
*H04L 29/08* (2006.01)

(52) U.S. Cl.
CPC ...... *H04L 63/1425* (2013.01); *H04L 63/1466* (2013.01); *H04L 69/22* (2013.01); *H04L 67/22* (2013.01)

(58) Field of Classification Search
CPC . H04L 63/1425; H04L 63/1466; H04L 69/22; H04L 67/22
See application file for complete search history.

(56) References Cited

U.S. PATENT DOCUMENTS

| | | |
|---|---|---|
| 7,307,999 B1 | 12/2007 | Donaghey |
| 7,555,482 B2 * | 6/2009 | Korkus ............... G06F 21/316 |
| 7,594,270 B2 | 9/2009 | Church et al. |
| 7,596,807 B2 | 9/2009 | Ptacek et al. |
| 8,046,835 B2 | 10/2011 | Herz |
| 8,521,132 B2 | 8/2013 | Washio |
| 8,885,929 B2 | 11/2014 | Ni et al. |
| 8,893,285 B2 | 11/2014 | Zucker et al. |

(Continued)

OTHER PUBLICATIONS

NPL Search (Google Scholar) (Year: 2020).*

(Continued)

*Primary Examiner* — Mahfuzur Rahman
*Assistant Examiner* — Richard W Cruz-Franqui

(57) ABSTRACT

A device may receive behavior information that identifies a first user, of a first set of users, in association with a behavior. The behavior may relate to one or more requests, from a client device being used by the first user, to access a network resource. The device may determine, based on a model, whether the behavior is normal. The model may include a normal behavior pattern based on behavior information associated with the first set of users. The device may provide an instruction to allow the client device to proceed with the behavior or provide an instruction to disallow the client device from proceeding with the behavior based on determining whether the behavior is normal. The device may update the model based on the behavior information that identifies the first user and that identifies the behavior.

20 Claims, 17 Drawing Sheets

(56) References Cited

U.S. PATENT DOCUMENTS

| | | |
|---|---|---|
| 9,117,075 B1 | 8/2015 | Yeh |
| 9,215,081 B2 | 12/2015 | Singh et al. |
| 9,240,996 B1 | 1/2016 | Sinnema |
| 9,258,321 B2 | 2/2016 | Amsler |
| 9,268,938 B1 | 2/2016 | Aguaya et al. |
| 9,411,009 B1 | 8/2016 | Aguaya et al. |
| 2006/0010110 A1* | 1/2006 | Kim ................ G06Q 40/00 |
| 2007/0067853 A1* | 3/2007 | Ramsey .......... G06F 21/316 |
| | | 726/28 |
| 2007/0089172 A1* | 4/2007 | Bare ................ G06F 21/552 |
| | | 726/24 |
| 2008/0262991 A1 | 10/2008 | Kapoor et al. |
| 2009/0113547 A1 | 4/2009 | Higashikado |
| 2012/0254999 A1 | 10/2012 | Sallam |
| 2014/0358845 A1 | 12/2014 | Mundlapudi et al. |
| 2015/0026027 A1 | 1/2015 | Priess et al. |
| 2015/0106888 A1 | 4/2015 | Cheng et al. |
| 2015/0128274 A1 | 5/2015 | Giokas |
| 2015/0172321 A1 | 6/2015 | Kirti et al. |
| 2015/0235152 A1 | 8/2015 | Eldardiry et al. |
| 2016/0261621 A1* | 9/2016 | Srivastava .......... H04L 63/1466 |
| 2017/0206462 A1* | 7/2017 | Arndt ................ G06F 9/50 |

OTHER PUBLICATIONS

Wikipedia, "IP Flow Information Export," http://en.wikipedia.org/wiki/IP_Flow_Information_Export, Dec. 13, 2014, 4 pages.

Wikipedia, "Short Message Service," http://en.wikipedia.org/wiki/Short_Message_Service, Feb. 18, 2015, 15 pages.

Wikipedia, "Naive Bayes classifier," http://en.wikipedia.org/wiki/Naive_Bayes_classifier, Mar. 2, 2015, 11 pages.

Xu et al., "Intrusion Detection using Continuous Time Bayesian Networks," Journal of Artificial Intelligence Research 39, https://www.jair.org/media/3050/live-3050-5347-jair.pdf, Dec. 8, 2010, 30 pages.

NPL Search History (Google Scholar) (Year: 2019).

\* cited by examiner

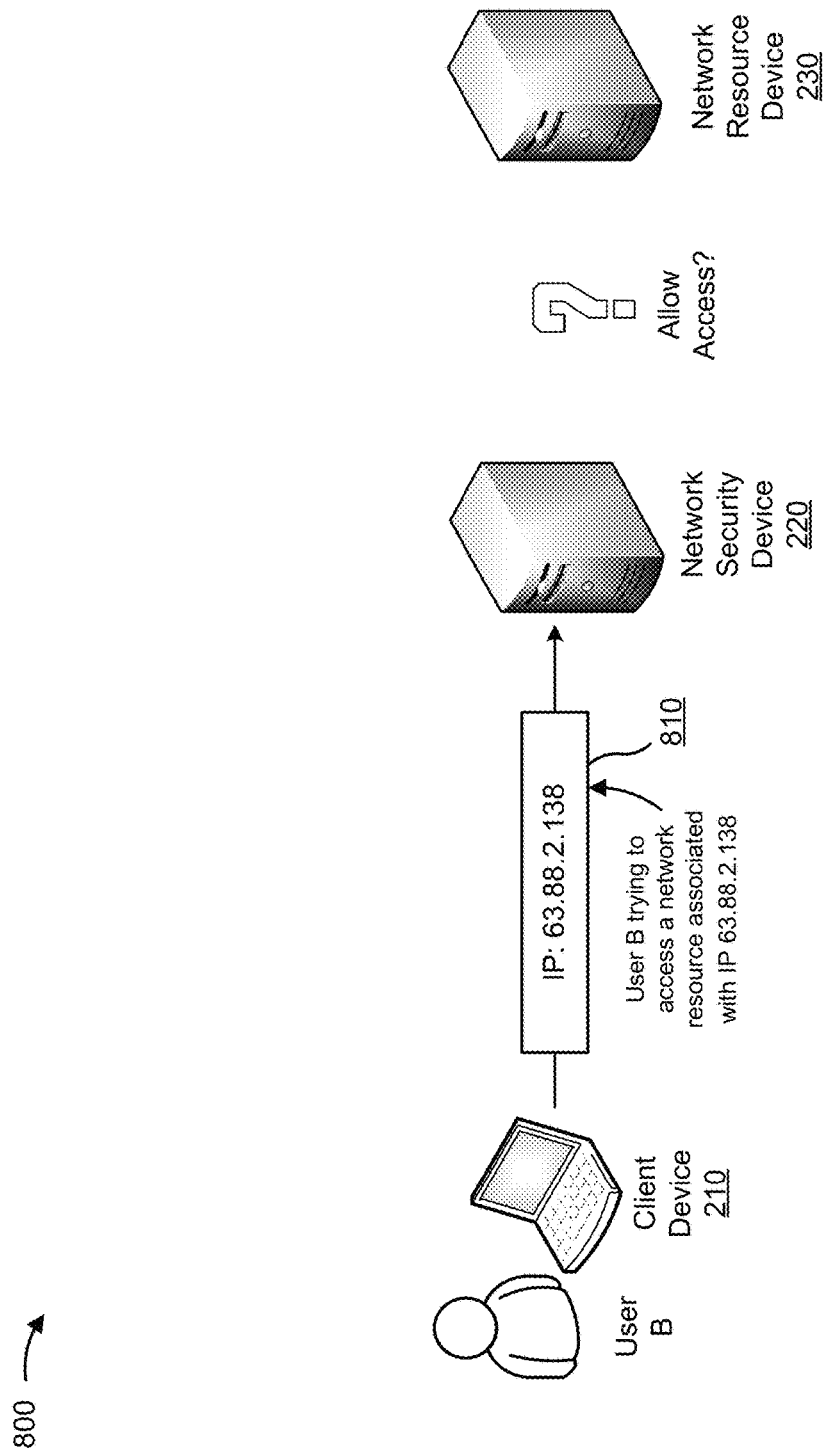

NETWORK THREAT DETECTION AND MANAGEMENT SYSTEM BASED ON USER BEHAVIOR INFORMATION

CROSS REFERENCE TO RELATED APPLICATION

This application is a continuation of U.S. patent application Ser. No. 14/635,158 filed Mar. 2, 2015, the content of which is herein incorporated by reference in its entirety.

BACKGROUND

Network security may be achieved using policies adopted by a network operator to prevent unauthorized access, use, and/or modification of a network and/or network resources. Threats to the network may include malware, distributed denial-of-service (DDoS) attacks, identity theft, insider threats, or the like. Detecting and/or neutralizing threats to the network in a timely manner may be crucial in securing the network.

BRIEF DESCRIPTION OF THE DRAWINGS

FIGS. 8A-8C are diagrams of another example implementation relating to the example process shown in FIG. 6;

DETAILED DESCRIPTION OF PREFERRED EMBODIMENTS

The following detailed description of example implementations refers to the accompanying drawings. The same reference numbers in different drawings may identify the same or similar elements.

A client device (e.g., a laptop computer, a cell phone, or the like), being used by a user, may be associated with a behavior and may be connected to a network. A behavior may include a request to access a network resource, which may be provided via the network by a network resource device and/or another client device. A network resource device may include a web server, a router, or the like. A network resource may include a website, a file, an email, a text message, a contacts list, a network service (e.g., voice calling, video calling, etc.), or the like. The behavior may also include a characteristic of the request to access a network resource (e.g., such as a frequency of a request, a time of day a request is made, a volume of data associated with a request, a communication protocol used to identify a network resource device, a port identifier used to identify a client device, or the like). The behavior may be a normal behavior (e.g., a behavior associated with a benign user of a client device) or may be an abnormal behavior (e.g., a behavior associated with a malicious hacker using a client device and/or associated with a benign user whose client device has been compromised).

A client device associated with an abnormal behavior may pose a threat to a network, a network resource, a network resource device, and/or another client device connected to the network. Implementations described herein may facilitate determining whether a user's behavior is normal using a model, which includes normal behavior patterns, and/or may facilitate updating the model based on the user's behavior. Implementations described herein may improve network security by using a cloud computing environment to perform big data analytics to preemptively detect and/or neutralize network threats.

Figure 1:
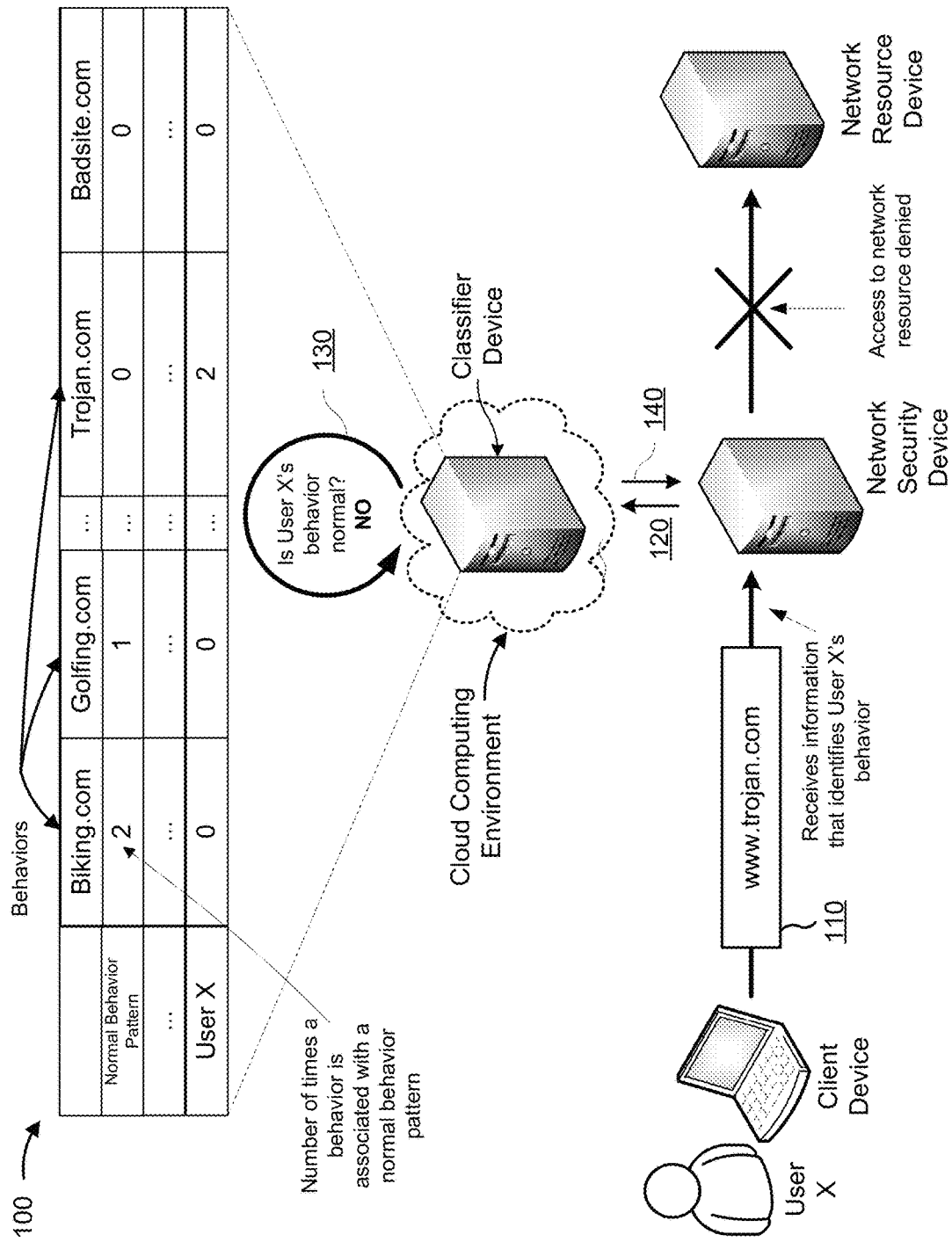
FIG. 1 is a diagram of an overview of an example implementation described herein.

FIG. 1 is a diagram of an overview of an example implementation 100 described herein. Assume that implementation 100 includes a client device, a network security device (e.g., a router, a firewall, a server, or the like), a classifier device (e.g., one or more servers included in a cloud computing environment), and a network resource device. Assume further that the classifier device has received (e.g., from an input device being used by a network operator) normal behavior parameters that define a normal behavior. Assume further that the classifier device has received behavior information from client devices being used by multiple users but has not received behavior information of User X. The multiple users may be using multiple client devices that are in communication with the classifier device (not shown). Assume further that the classifier device has created a model that includes a normal behavior pattern associated with the multiple users (e.g., shown as information in a row labeled "Normal Behavior Pattern" in a data structure stored by the classifier device). The normal behavior pattern may be an average of behaviors, associated with the multiple users, that conform to the normal behavior parameters.

As shown in FIG. 1, the client device, upon receiving an input from User X, may send a request to access a network resource (e.g., the website "trojan.com," as shown by reference number 110). Assume that User X had already sent one other request to access trojan.com during a certain time period. Thus, two requests for trojan.com are included in User X's behavior. The network security device may receive behavior information that identifies User X's behavior. As shown by reference number 120, the network security device may provide the behavior information to the classifier device. As shown by reference number 130, the classifier device may determine, using the model, whether User X's behavior is normal.

The classifier device may compare User X's behavior to the normal behavior pattern. The classifier device may determine that a difference between User X's behavior and the normal behavior pattern satisfies a threshold. The classifier device may determine that User X's behavior is abnormal based on determining that the threshold is satisfied. The threshold may be satisfied because the normal behavior pattern includes zero requests to trojan.com but User X's behavior includes two requests to trojan.com. In other words, the classifier device, using the model, may determine that there is a high probability that a user that often requests access to "trojan.com" is an abnormal user who poses a network threat (e.g., "trojan.com" may be a website often used by malicious hackers to download malware that can be spread to other client devices connected to the network).

In order to prevent and/or neutralize a network threat associated with User X's abnormal behavior, the classifier device may provide an instruction, as shown by reference number 140, that instructs the network security device to deny the client device permission to access the network resource. The network security device may provide, to the client device, a notification, indicating that access to "www.trojan.com" has been blocked because of a network threat. The classifier device may store User X's behavior information and update the model based on user X's behavior information.

In some implementations, millions or billions of different behaviors may be used by classifier device 240 to create normal behavior patterns. Additionally, or alternatively, normal behavior patterns may also be individually created for the normal behaviors of millions or billions of different users (or user groups). In some implementations, hundreds or thousands of classifier devices (e.g., servers), included in a cloud computing environment, may be used to create the model and to use the model to classify user behavior as normal or abnormal. In this way, the classifier device(s) may use big data analytics to identify and/or neutralize network threats.

In some implementations, the network security device may allow a client device to access a network resource when the classifier device determines that a client device is engaged in normal behavior. In some implementations, a network operator may request, using a computing device, threat analytics associated with the network, from the classifier device. Additionally, or alternatively, the computing device may display the threat analytics associated with the network. For example, the threat analytics may include a list of threats by name of threat and/or by threat category (e.g., virus, trojan horse, etc.), may include a timeline showing a real-time volume of threats, may include maps for locating a client device that is an origin of the threat, may include maps that show a path of infection associated with the threat, may include a time period used to detect the threat, and so on. Additionally, or alternatively, the threat analytics may assist the network operator in performing an action to neutralize a network threat.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information.

In this way, the classifier device may use big data analytics to facilitate determining whether a user's behavior is normal using a model and/or may facilitate updating the model using the user's behavior. Implementations described herein may improve network security by detecting and/or neutralizing network threats in a time sensitive manner.

Figure 2:
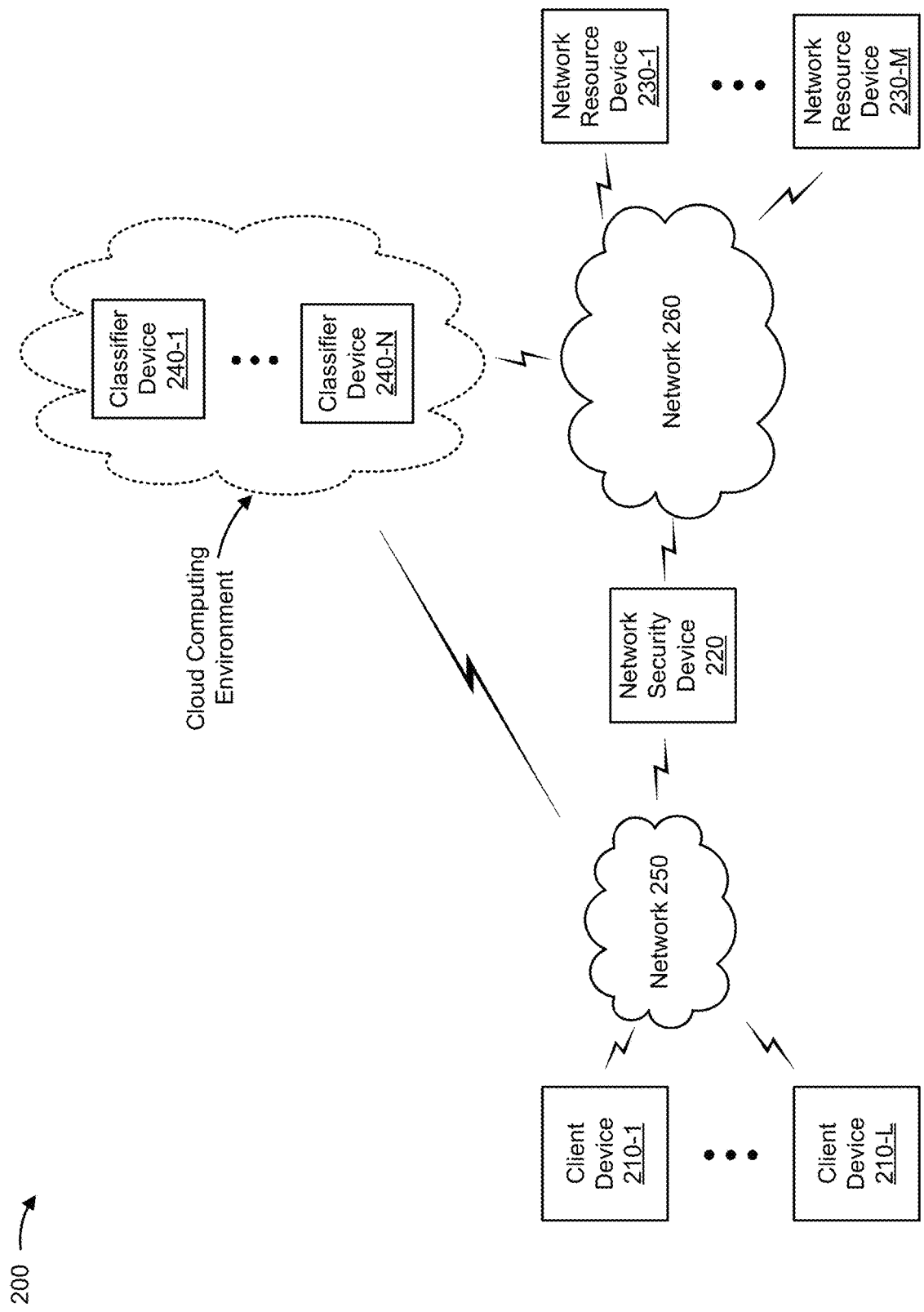
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more client devices 210-1 through 210-L (L≥1) (hereinafter referred to collectively as "client devices 210," and individually as "client device 210"), a network security device 220, one or more network resource devices 230-1 through 230-M (M≥1) (hereinafter referred to collectively as "network resource devices 230," and individually as "network resource device 230"), one or more classifier devices 240-1 through 240-N(N≥1) (hereinafter referred to collectively as "classifier devices 240," and individually as "classifier device 240"), network 250, and/or network 260. Devices of environment 200 may interconnect via wired connections, wireless connections, or a combination of wired and wireless connections.

Client device 210 may include one or more devices capable of receiving and/or providing information over a network, and/or capable of generating, storing, and/or processing information received and/or provided over the network. For example, client device 210 may include a laptop computer, a tablet computer, a handheld computer, a desktop computer, a mobile phone (e.g., a smart phone, a radiotelephone, or the like), or a similar device. In some implementations, client device 210 may be a device that is not associated with a user (e.g., a plurality of client devices 210, not associated with a user, may form an internet of things). In some implementations, client device 210 may request access to a network resource (e.g., content provided by network resource device 230).

Network security device 220 may include one or more devices capable of processing and/or transferring traffic between client devices 210 and/or network resource devices 230. Additionally, or alternatively, network security device 220 may include one or more devices capable of generating, storing, and/or processing information received and/or provided over a network. For example, network security device 220 may include a firewall, a router, a gateway, a switch, a hub, a bridge, a reverse proxy, a server (e.g., a proxy server), an intrusion detection device, a load balancer, two or more distributed devices, a virtual machine of a cloud computing environment, or the like. In some implementations, network security device 220 may receive, from client device 210, a request to access a network resource associated with network resource device 230 and/or another client device 210. Additionally, or alternatively, network security device 220 may provide, to classifier device 240, behavior information that identifies a behavior associated with a user, so that classifier device 240 may determine whether the behavior is normal.

Network resource device 230 may include one or more devices associated with a network resource, such as a web site, an email, a file, streaming content, a network (e.g., a private network), or the like. For example, network resource device 230 may include a server (e.g., a web server, a gaming server, an application server, an email server, etc.), a traffic transfer device (e.g., a router, a switch, etc.), a desktop computer, or the like.

Classifier device 240 may include one or more devices capable of receiving and/or providing information over a network, and/or capable of generating, storing, and/or processing information received and/or provided over the network. Classifier device 240 may include a server (e.g., a remote server included in a cloud computing environment, a processing server, an application server, a web server, a file server, or the like), a distributed computing device, a cloud computing device, or the like. Additionally, or alternatively, classifier device 240 may, based on classifying behavior exhibited by client device 210 as normal or abnormal, instruct network security device 220 to grant or deny client device 210 permission to access a network resource. In some implementations, classifier device 240 may implement a model, which includes a normal behavior pattern associated with a user, associated with a user group, and/or associated with all users, for determining whether the user's behavior is normal.

Network 250 may include one or more wired and/or wireless networks that interconnect client devices 210 and/or network security device 220. For example, network 250 may include a cellular network (e.g., a long-term evolution (LTE) network, a 4G network, a 3G network, a code division multiple access (CDMA) network, or the like), a public land mobile network (PLMN), a local area network (LAN), a wide area network (WAN), a metropolitan area network (MAN), a telephone network (e.g., the Public Switched Telephone Network (PSTN), an ad hoc network, an intranet, the Internet, a fiber optic-based network, a private network, a cloud computing network, and/or a combination of these or other types of networks.

Network 260 may include one or more wired and/or wireless networks that interconnect network security device 220, network resource device 230, and/or classifier device 240. For example, network 260 may include the internet, an intranet, a fiber optic-based network, a private network, a cloud computing network, an ad hoc network, a cellular network (e.g., a long-term evolution (LTE) network, a 4G network, a 3G network, a code division multiple access (CDMA) network, or the like), a public land mobile network (PLMN), a local area network (LAN), a wide area network (WAN), a metropolitan area network (MAN), a telephone network (e.g., the Public Switched Telephone Network (PSTN), and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. For example, classifier device 240 may be implemented using one or more components of network 250 and/or network 260 (e.g., one or more client devices 210, network security device 220, and/or one or more network resource devices 230). Additionally, or alternatively, a set of devices (e.g., one or more devices) of environment 200 may perform one or more functions described as being performed by another set of devices of environment 200.

Figure 3:
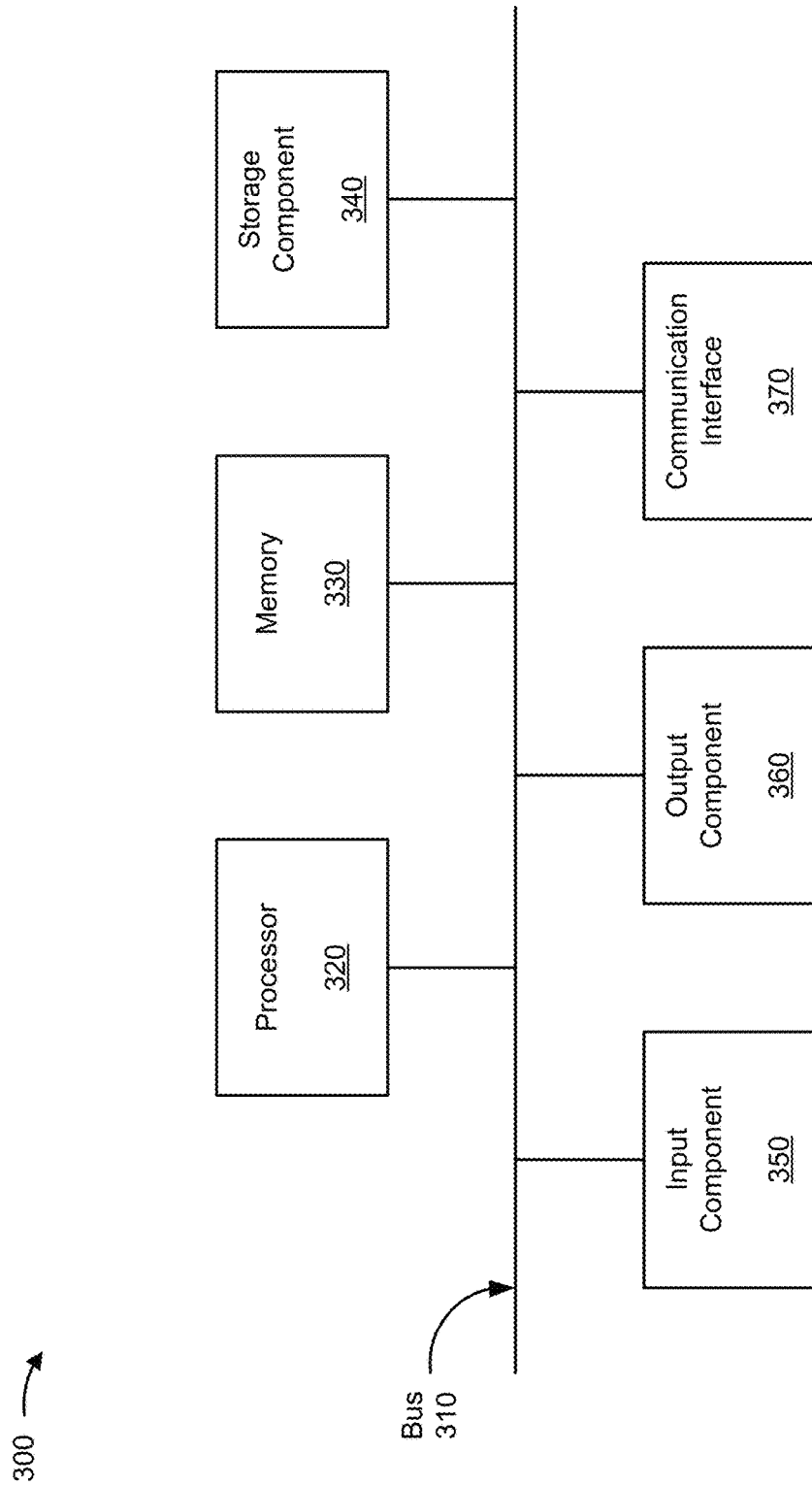
FIG. 3 is a diagram of example components of one or more devices of FIG. 2.

FIG. 3 is a diagram of example components of a device 300. Device 300 may correspond to client device 210, network security device 220, network resource device 230, and/or classifier device 240. In some implementations, client device 210, network security device 220, network resource device 230, and/or classifier device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
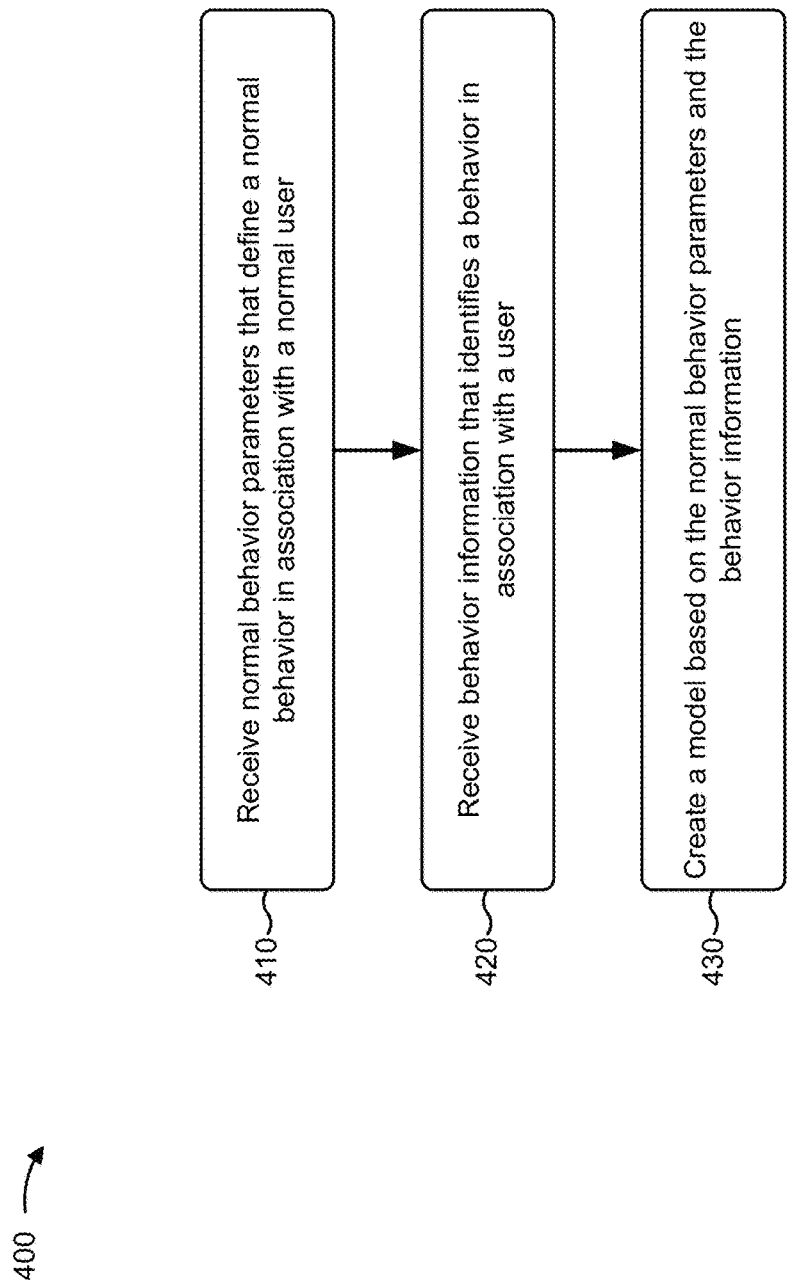
FIG. 4 is a flow chart of an example process for creating a model.

FIG. 4 is a flow chart of an example process 400 for creating a model. In some implementations, one or more process blocks of FIG. 4 may be performed by classifier device 240. In some implementations, one or more process blocks of FIG. 4 may be performed by another device or a set of devices separate from or including classifier device 240, such as client device 210, network security device 220, and/or network resource device 230.

As shown in FIG. 4, process 400 may include receiving normal behavior parameters that define a normal behavior in association with a normal user (block 410). For example, classifier device 240 may receive, from an input device being used by a network operator, normal behavior parameters that define a normal behavior (e.g., a behavior that is likely not associated with a network attack) of a normal user. In some implementations, the normal behavior parameters may be based on the network operator's knowledge of behaviors typically not associated with a network attack. For example, the normal behavior parameters may include information that defines a normal user (e.g., a fictitious and/or idealized user associated with a normal behavior that is constructed based on the network operator's expertise) and a normal behavior associated with the normal user. In some implementations, the normal behavior parameters may be used, by classifier device 240, in combination with behavior information received from client devices 210 (e.g., being used by non-fictitious users) to create a model (e.g., as described below in connection with block 430).

In some implementations, normal behavior parameters that define a normal behavior may include information that identifies a quantity of requests during a period of time, a network resource associated with a request, or the like. Additionally, or alternatively, normal behavior parameters that define a normal user may include information that identifies an age of the normal user, a geographic location of the normal user, a demographic group to which the normal user belongs, or the like.

For example, classifier device 240 may receive, from the input device, normal behavior parameters that define User H, who resides in the USA, as a normal user and that define a normal behavior, associated with User H, as a behavior that includes requesting the one hundred most popular websites in the USA. As another example, the normal behavior parameters may define User I, who may be any user, as a normal user and may define a normal behavior, associated with User I, as a behavior that includes a low quantity of requests, for a network resource, during a time period between 2 a.m. and 6 a.m. on weekdays.

As another example, the normal behavior parameters may define User J, who may be a user associated with a cell phone network, as a normal user and may define a normal behavior, associated with User J, as a behavior not associated with a network attack within a threshold time period after the behavior (e.g., a behavior not linked to a network attack, as established by classifier device 240 and/or a network operator, within 1 month after the behavior, 1 year after the behavior, or the like).

As another example, the normal behavior parameters may define user L, who may represent any user, as a normal user and may define a normal behavior, associated with user L, as a behavior that does not include requests to access millions of other client devices 210 within a short period of time such as an hour, a day or the like (e.g., in order to spread malware). As another example, the normal behavior parameters may define user M, who may represent any user, as a normal user and may define a normal behavior, associated with user M, as a behavior that does not include requests to access a network resource in concert with millions of other client devices 210 (e.g., in order to engage in a DDoS attack on the network resource).

As another example, the normal behavior parameters may define user N, who may represent any user, as a normal user and may define a normal behavior, associated with user N, as a behavior that does not include performing smaller attacks (e.g., in order to test effectiveness of malware as a pre-cursor to a more widespread attack). As another example, the normal behavior parameters may define user P, who may represent any user, as a normal user, and may define a normal behavior, associated with user P, as a behavior that does not include using a port access or a communication protocol known (e.g., to the network operator) to be common among client devices 210 that pose a network threat.

As another example, the normal behavior parameters may be based on well known normal behaviors that are characteristic of a client device 210 that has not been compromised (e.g., by malware unintentionally downloaded onto client device 210). For example, the normal behavior parameters may define User R, who may represent any user, as a normal user, and may define a normal behavior, associated with User R, as a behavior that does not include requests to websites known to be sources of malware (e.g., top 100 websites associated with malware). As another example, the normal behavior parameters may define User S, who may represent any user, as a normal user, and may define a normal behavior, associated with User S, as a behavior that does not include requests to website content known to be associated with malware (e.g., top 10 content categories associated with malware) or requests to websites hosted in countries known to be associated with malware.

As further shown in FIG. 4, process 400 may include receiving behavior information that identifies a behavior in association with a user (block 420). For example, classifier device may receive behavior information, originating from client device 210 being used by a user, that identifies a behavior in association with the user (e.g., a real, non-fictitious user).

A behavior may include a request, by client device 210 being used by a user, to access a network resource, which may be provided by network resource device 230 and/or another client device 210. Additionally, or alternatively, the behavior may include a characteristic of the request to access a network resource. For example, the behavior may include an Internet Protocol (IP) address associated with a network resource, a frequency of a request, a time and day of a request, a quantity of data associated with a request, a communication protocol associated with a request, a port identifier associated with a network resource, a geographical area associated with a network resource, and/or any other characteristic of a request that may assist in determining that a particular behavior is either normal or abnormal. In some implementations, a behavior may include an aggregation of behaviors exhibited by a user over a particular time period.

In some implementations, information that identifies a user may include an Internet Protocol (IP) address of client device 210 being used by a user, a type of client device 210 (e.g., a smartphone, a tablet, a desktop computer, etc.) being used by a user, an operating system being used by a user, an internet browser being used by a user, a manufacturer of client device 210 being used by a user, a port identifier of client device 210 being used by a user, a geographic area of a user, an age of a user, an educational background of a user, a gender of a user, any other demographic information about a user, and/or any other information associated with a user that may assist in determining that a user behavior is normal or abnormal.

In some implementations, classifier device 240 may receive behavior information from network security device 220, which may have received behavior information from network devices (e.g., sensors), connected to network 250, that detect network traffic provided by client devices 210. Additionally, or alternatively, classifier device 240 may receive behavior information from network devices (e.g., sensors), connected to network 250, that detect network traffic provided by client devices 210. Additionally, or alternatively, classifier device 240 may deploy software on client devices 210 in order to receive behavior information. That is, client devices 210 may record, as behavior information, behaviors of users of client devices 210 and transmit, in substantially real time or at determined intervals, the behavior information to classifier device 240.

In some implementations, classifier device 240 may receive behavior information using one or more of the following techniques: receiving information based on an Internet Protocol Flow Information Export (IPFIX) protocol used to export flow information from routers, probes, and other devices that are used by mediation systems, accounting/billing systems, and network management systems; receiving information from logs and/or databases associated with Short Message Service (SMS), Multimedia Messaging Service (MMS), or the like; receiving information from logs and/or databases associated with aggregating known security threats; or some other technique. Additionally, or alternatively, classifier device 240 may receive behavior information in a live streaming fashion from a large quantity of users (e.g., tens of millions, hundreds of millions, etc.) and may receive behavior information that identifies a large quantity of behaviors (e.g., one billion, ten billion, etc.) of a user (e.g., a behavior of a user may include an aggregation of behaviors originating from above mentioned methods). In some implementations, classifier device 240 may use big data analytics techniques, such as massively parallel software running on hundreds, thousands, or more servers, in order to process and/or store the behavior information.

In some implementations, receiving the behavior information using the above mentioned techniques and using big data analytics techniques to process the behavior information may improve accuracy and/or speed of predictions made by classifier device 240, thereby allowing classifier device 240 to quickly and accurately detect abnormal behavior and take appropriate action to prevent network threats. Additionally, or alternatively, quickly detecting abnormal behavior may be crucial since some network threats multiply themselves exponentially and even a few seconds of early warning may prevent harm to a large quantity of devices and/or network resources associated with a network.

As further shown in FIG. 4, process 400 may include creating a model based on the normal behavior parameters and the behavior information (block 430). For example, classifier device 240 may create a model, which includes a normal behavior pattern associated with the user. In some implementations, the normal behavior pattern may be an average of behaviors, during a particular time period, of the user that conform to the normal behavior parameters. For example, behaviors of the user that conform to the normal behavior parameters may include an average of five requests to xyz.com per day and an average of two requests to golfing.com per day (e.g., the normal behavior pattern of the user may include five requests to xyz.com and two requests to golfing.com). In some implementations, classifier device 240 may create the model, which includes a normal behavior pattern of a user, after collecting, for a threshold time period, behavior information originating from client device 210 being used by the user. The threshold time period may be an hour, a day, a month, or the like.

For example, a normal behavior pattern associated with a user, who resides in the USA, may include a behavior that includes ten requests for golfing.com (e.g., a website in the one hundred most popular websites in the USA) because the user's client device 210 engaged in the behavior and the behavior conforms to a normal behavior parameter (e.g., requesting the one hundred most popular websites in the USA). As another example, a normal behavior pattern associated with a user, associated with a cell phone network, may include a behavior, which occurred a year ago, that includes twenty requests to 455.com (e.g., an obscure and/or unpopular website) because the user's client device 210 engaged in the behavior and the behavior conforms to a normal behavior parameter (e.g., assume that the behavior has not been linked to a network attack even after a year has passed).

Additionally, or alternatively, the model may create a normal behavior pattern based on behavior information received from client devices 210 used by the multiple users. In some implementations, classifier device 240 may classify a user's behavior as normal or abnormal based on a normal behavior pattern associated with multiple users who belong to a group to which the user belongs (e.g., a user group).

For example, the normal behavior pattern, used for classifying a user's behavior, may be different based on a user group to which a user belongs. For example, for a user in South Dakota, a request for "Badsite.com" may be a part of a normal behavior pattern (e.g., because normal users in South Dakota may be curious about badlands regions of South Dakota) whereas for a user in Virginia, USA, a request for "Badsite.com" may not be a part of a normal behavior pattern.

In some implementations, a user group may be defined based on: an IP address of client device 210 being used by a user, a type of client device 210 (e.g., a smartphone, a tablet, a desktop computer, etc.) being used by a user, an operating system being used by a user, an internet browser being used by a user, a manufacturer of client device 210 being used by a user, a port identifier of client device 210 being used by a user, a geographic area of a user, an age of a user, an educational background of a user, a gender of a user, any other demographic information associated with a user, and/or any other variable that may form a user group that may assist in determining that a particular user's behavior is normal or abnormal.

In some implementations, classifier device 240 may classify a user's behavior as normal or abnormal based on a normal behavior pattern associated with users associated with a particular network and/or users for whom classifier device 240 possesses behavior information (e.g., a normal behavior pattern associated with all users for whom classifier device 240 possesses behavior information).

In some implementations, classifier device 240 may create the model based on a naive Bayesian classifier. A naive Bayesian classifier may include a classifier that assumes that a value of a particular input variable is independent of a value of any other input variable when calculating an output variable. For example, a fruit may be classified as an apple (e.g., the output variable) if it is red, round, and about 3" in diameter (e.g., input variables). A naive Bayesian classifier considers each of these input variables to contribute independently to a probability that the fruit is an apple (e.g., regardless of any possible correlations between color, roundness, and diameter features). In some implementations, the model may use behaviors as input variables to calculate an output variable (e.g., whether a user is behaving normally) based on a naive Bayesian classifier. Additionally, or alternatively, the model may use other probabilistic approaches (e.g., besides naive Bayesian classifiers) and/or other mathematical approaches for creating a model to determine whether the user's behavior is normal.

In some implementations, classifier device 240 may provide the model, which includes patterns of normal behavior, to network security device 220, which may determine whether a user's behavior is normal. Additionally, or alternatively, classifier device 240 may provide a portion of the model or a simplified version of the model to network security device 220, which may determine whether the user's behavior is normal. Additionally, or alternatively, classifier device 240 may provide a portion of the model or a simplified version of the model, to client device 210 being used by the user (e.g., in some implementations, client device 210 may regulate client device 210's access to a network resource based on determining whether the user's behavior is normal).

While the above description focused on modeling the normal behavior of users, in some implementations, classifier device 240 may additionally, or alternatively, model the abnormal behavior of users.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
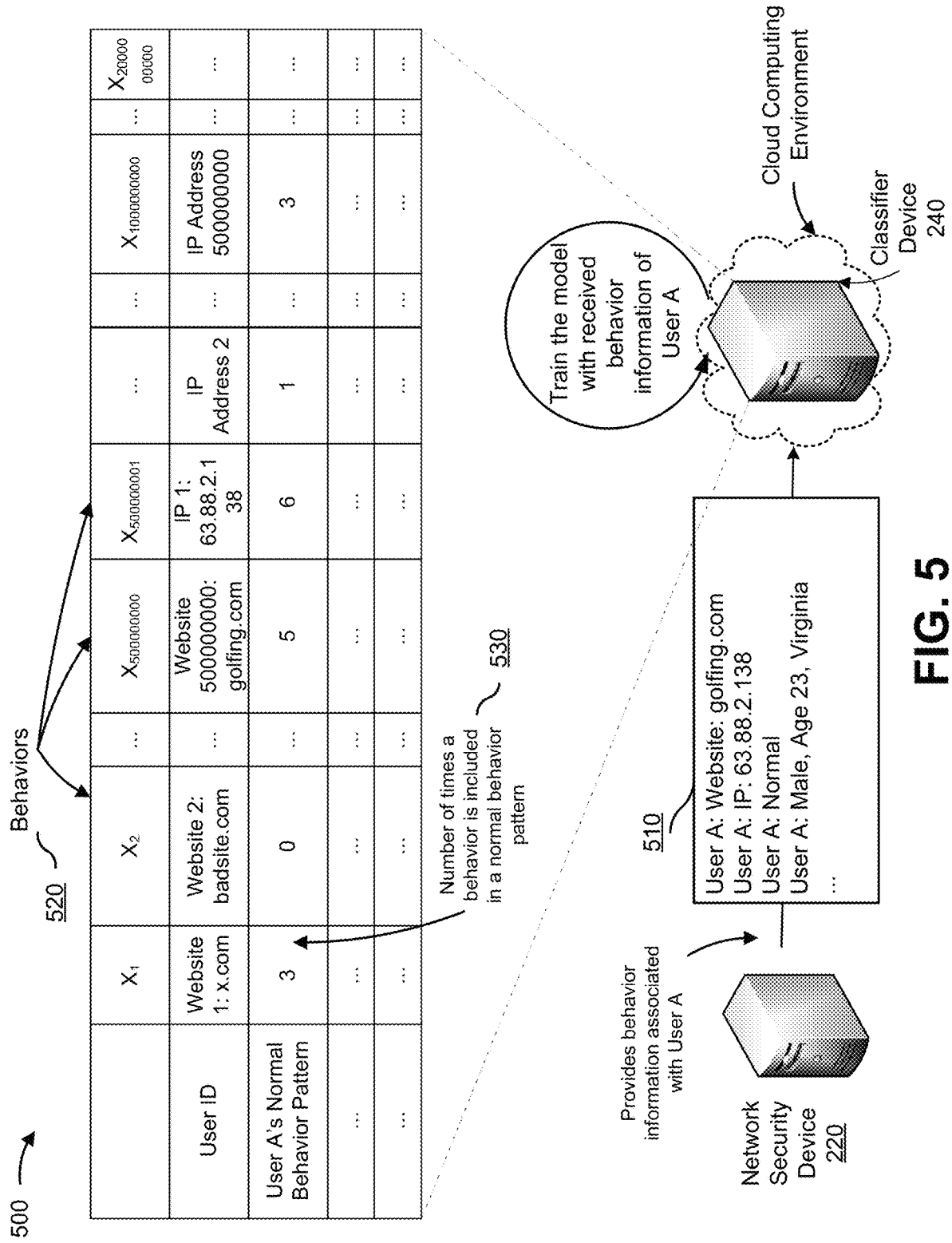
FIG. 5 is a diagram of an example implementation relating to the example process shown in FIG. 4.

FIG. 5 is a diagram of an example implementation 500 relating to example process 400 shown in FIG. 4. FIG. 5 shows an example of creating a model.

As shown in FIG. 5, assume that example implementation 500 includes classifier device 240, included in a cloud computing environment, and network security device 220. Assume that classifier device 240 has received normal behavior parameters from an input device (not shown) being used by a network operator. As shown by reference number 510, classifier device 240 receives behavior information associated with User A from network security device 220, which may have received the behavior information from client device 210 being used by User A. The information received includes information associated with a user (e.g., shown as "User A: Male, Age 23, Virginia," etc.) and one or more behaviors associated with the user (e.g., shown as "User A: Website: golfing.com").

Classifier device 240 trains a model with the behavior information associated with User A. The model includes a normal behavior pattern associated with User A. The normal behavior pattern associated with User A is shown as a row labeled "User A's Normal Behavior Pattern" in a data structure stored by classifier device 240.

As shown by reference number 520, several columns of the data structure store variables that represent behaviors (e.g., such as variable $X_2$ that represents a behavior that includes a request to access badsite.com). In this example, two billion variables are dedicated to representing behaviors associated with a user's normal behavior pattern. As shown by reference number 530, the value corresponding to a particular row and a particular behavior represents the number of times a behavior is included in the normal behavior pattern. For example, the normal behavior pattern includes three requests for a network resource x.com, zero requests for a network resource badsite.com, and so on.

The model may use the pattern of normal behavior for determining whether a user's behavior is normal (as described below in connection with FIG. 6), in order to preemptively neutralize network threats.

As indicated above, FIG. 5 is provided merely as an example. Other examples are possible and may differ from what was described with regard to FIG. 5.

Figure 6:
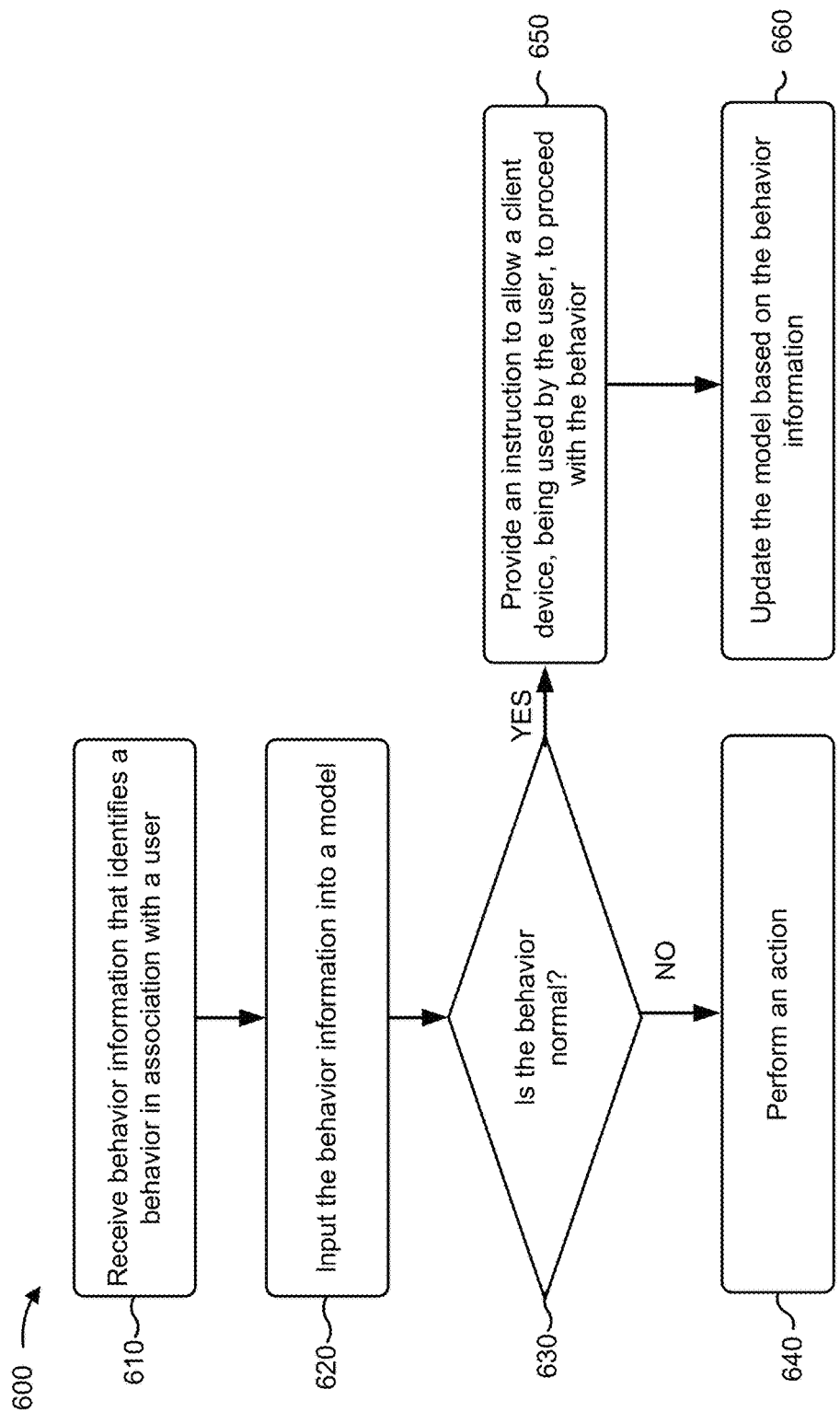
FIG. 6 is a flow chart of an example process for determining whether a user's behavior is normal and/or updating the model based on the user's behavior.

FIG. 6 is a flow chart of an example process 600 for determining whether a user's behavior is normal and/or updating the model based on the user's behavior. In some implementations, one or more process blocks of FIG. 6 may be performed by classifier device 240. In some implementations, one or more process blocks of FIG. 6 may be performed by another device or a set of devices separate from or including classifier device 240, such as client device 210, network security device 220, and/or network resource device 230.

As shown in FIG. 6, process 600 may include receiving behavior information that identifies a behavior in association with a user (block 610). For example, classifier device 240 may receive, from network security device 220, behavior information that identifies a user and a behavior of the user (e.g., network security device 220 may have received the behavior information from client device 210 being used by the user). In some implementations, the behavior may include an aggregation of behaviors, exhibited by client device 210 being used by the user, over some period of time. For example, the behavior may include three requests by client device 210 to golfing.com and four requests to biking.com (e.g., the behavior may be an aggregate of the requests by client device 210 over some period of time). In some implementations, network security device 220 may identify behavior information based on receiving network traffic from the user's client device 210.

In some implementations, classifier device 240 may receive behavior information from network security device 220, which may have received behavior information from network devices (e.g., sensors), connected to network 250, that detect network traffic provided by client devices 210. Additionally, or alternatively, classifier device 240 may receive behavior information from network devices (e.g., sensors), connected to network 250, that detect network traffic provided by client devices 210. Additionally, or alternatively, classifier device 240 may deploy software on client devices 210 in order to receive behavior information.

As further shown in FIG. 6, process 600 may include inputting the behavior information into a model (block 620) and determining whether the behavior is normal (block 630). For example, classifier device 240 may input the behavior information into a model (e.g., the model created as described above in connection with FIG. 4) to determine whether the behavior is normal.

In some implementations, classifier device 240 may determine that classifier device 240 has previously received behavior information of the user. Additionally, or alternatively, classifier device 240 may determine that classifier device 240 has created a model that includes a normal behavior pattern associated with the user. In such an implementation, classifier device 240 may input the behavior information into the model. Classifier device 240, using the model, may determine whether the behavior is normal based on whether a difference between the user's current behavior and the user's normal behavior pattern satisfies a threshold. For example, if the difference between the user's current behavior and the user's normal behavior pattern satisfies a threshold, classifier device 240 may determine that the user's current behavior is abnormal. As another example, if the difference between the user's current behavior and the user's normal behavior pattern does not satisfy a threshold, classifier device 240 may determine that the user's current behavior is normal. In some implementations, classifier device 240 may determine a threshold difference to be used based on a mathematical formula (for example, a mathematical formula that applies greater weight to certain behaviors included in the user's normal behavior pattern) and/or information received from an input device being used by a network operator.

For example, assume that a user's current behavior is two requests to access golfing.com. Assume further that the user's normal behavior pattern includes three requests to access golfing.com. Classifier device 240 may classify the user's current behavior as normal because the difference between the user's current behavior and the user's normal behavior pattern does not satisfy a threshold (e.g., assuming that a threshold difference required to classify a behavior as abnormal is greater than a difference of a single request to a single network resource).

In some implementations, classifier device 240 may determine that classifier device 240 has not created a model that includes a normal behavior pattern associated with the user (e.g., because classifier device 240 has not previously received behavior information associated with the user). In such an implementation, classifier device 240 may determine a user group to which the user belongs (e.g., classifier device 240 may know an operating system associated with the user, a geographical location of the user, or the like). Additionally, or alternatively, classifier device 240 may have created a model which includes a normal behavior pattern associated with users who belong to the user group. Additionally, or alternatively, classifier device may classify the user's behavior based on the normal behavior pattern associated with users who belong to the user group.

For example, assume that the user's behavior is three requests to access www.badsite.com and that the user is in Virginia. In such an example, assume that the normal behavior pattern associated with users in Virginia includes zero requests to access www.badsite.com. In such an example, classifier device 240 may determine that the behavior is abnormal because the difference between the user's behavior and the normal behavior pattern associated with users in Virginia satisfies a threshold (e.g., a difference of three requests may be larger than a threshold difference required to classify a behavior as abnormal).

In some implementations, classifier device 240 may not be able to determine a group to which the user belongs and/or may not have created a model that includes patterns associated with the user group. In such an implementation, classifier device 240 may classify the user's behavior based on a normal behavior pattern associated with all users for whom classifier device 240 has received behavior information.

In some implementations, classifier device 240 may classify the user's behavior based on an abnormal behavior pattern associated with a user, associated with a user group, and/or associated with all users.

In some implementations, despite determining that classifier device 240 has received a user's behavior information from client device 210, classifier device 240 may classify the behavior based on a normal behavior pattern associated with a user group to which the user belongs (for example, if comparing the user's behavior to the user's normal behavior pattern does not provide a conclusive classification of the behavior). Additionally, or alternatively, despite classifier device 240 being able to determine a group to which the user belongs, classifier device 240 may classify the user's behavior based on a normal behavior pattern associated with all users for whom classifier device 240 has received behavior information (for example, if comparing the user's behavior to a user group's normal behavior pattern does not provide a conclusive classification of the behavior). In some implementations, classifier device 240 may use another mathematical and/or probabilistic technique to classify the user's behavior.

In some implementations, network security device 220 may use the model to determine whether the behavior is normal. Additionally, or alternatively, network security device 220 may use a simplified version of the model to determine whether the behavior is normal. In some implementations, client device 210, being used by the user, may use a simplified version of the model to determine whether client device 210 is behaving normally, and self-regulate client device 210.

As further shown in FIG. 6, if the behavior is abnormal (block 630—NO), then process 600 may include performing an action (block 640). For example, if the behavior is abnormal, classifier device 240 may provide an instruction to network security device 220, which may deny permission to client device 210, being used by the user, to proceed with the behavior (e.g., network security device 220 may deny client device 210 access to the network resource). In such an example, network security device 220 may disconnect client device 210 from network 250 (e.g., by instructing a component of network 250 to remove client device 210's authorization to connect to network 250), may disconnect client device 210 from network 260 (e.g., by dropping network traffic originating from client device 210), and/or may prevent client device 210 from engaging in the behavior in some other way.

In some implementations, if the behavior is abnormal, classifier device 240 may provide an instruction, to network security device 220, to monitor the user (e.g., classifier device 240 may provide the instruction to monitor the user if the behavior's abnormality is below a threshold level of abnormality; the behavior's abnormality may not be significant enough to warrant denying permission to client device 210 to proceed with the behavior).

Additionally, or alternatively, if the behavior is abnormal, classifier device 240 may provide an instruction, to network security device 220 and/or another network device, to take drastic action such as shutting down a part of a network, dropping all network traffic intended for a network resource device 230, or the like (e.g., classifier device 240 may provide the instruction to take drastic action if the behavior's abnormality exceeds a threshold level of abnormality; the behavior's abnormality may be so extreme that merely denying permission to client device 210 to proceed with the behavior is not an adequate remedy).

In some implementations, if the behavior is abnormal, classifier device 240 may perform an action to neutralize a network threat associated with the behavior. For example, classifier device 240 may determine which client device 210 is an origin of a network threat associated with the behavior. In such an example, classifier device 240 may instruct network security device 220 to disconnect client device 210 that is the origin of the network threat from network 250, and/or from network 260. Additionally, or alternatively, classifier device 240 may store information that identifies client device 210 that is the origin of the network threat in order to better prevent future network threats.

In some implementations, classifier device 240 may determine which client devices 210 have been affected by the network threat. Additionally, or alternatively, classifier device 240 may provide an instruction to disconnect (e.g., from network 250 and/or network 260) client devices 210 that have been affected by the network threat. Additionally, or alternatively, classifier device 240 may store a list of User IDs associated with client devices 210 that have been affected by the network threat.

In some implementations, classifier device 240 may choose to take drastic action, to monitor the user, and/or to deny permission to engage in the behavior based on whether a determination of abnormality of the behavior is based on a user's normal behavior pattern, a user group's normal behavior pattern, and/or a normal behavior pattern of all users (e.g., classifier device 240 may choose an action based on which normal behavior pattern is used to determine abnormality).

In some implementations, classifier device 240 may store behavior information that identifies a user's abnormal behavior. Additionally, or alternatively, behavior information that identifies a user's abnormal behavior may be used by classifier device 240 to modify the model (e.g., by adding a new variable, which represents the abnormal behavior, to the normal behavior pattern; the new variable may have a zero or negative value in the normal behavior pattern).

As further shown in FIG. 6, if the behavior is normal (block 630—YES), then process 600 may include providing an instruction to allow a client device, being used by the user, to proceed with the behavior (block 650). For example, if the behavior is normal, then classifier device 240 may instruct network security device 220 to grant the user permission to proceed with the behavior. In some implementations, network security device 220 may grant client device 210, being used by the user, access to one or more network resources requested by the user.

As further shown in FIG. 6, process 600 may include updating the model based on the behavior information (block 660). For example, classifier device 240 may update the model based on the behavior information. In some implementations, classifier device 240 may update the model by using the behavior information to modify the normal behavior pattern associated with the user, associated with a group to which the user belongs, and/or associated with all users for whom classifier device 240 has received behavior information. Additionally, or alternatively, updating the model based on the behavior information may improve the accuracy and speed with which the model can determine whether a future behavior is normal (e.g., because each new behavior adds data points that the model can use to better classify future behaviors. The model uses a learning technique that uses the behavior information).

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
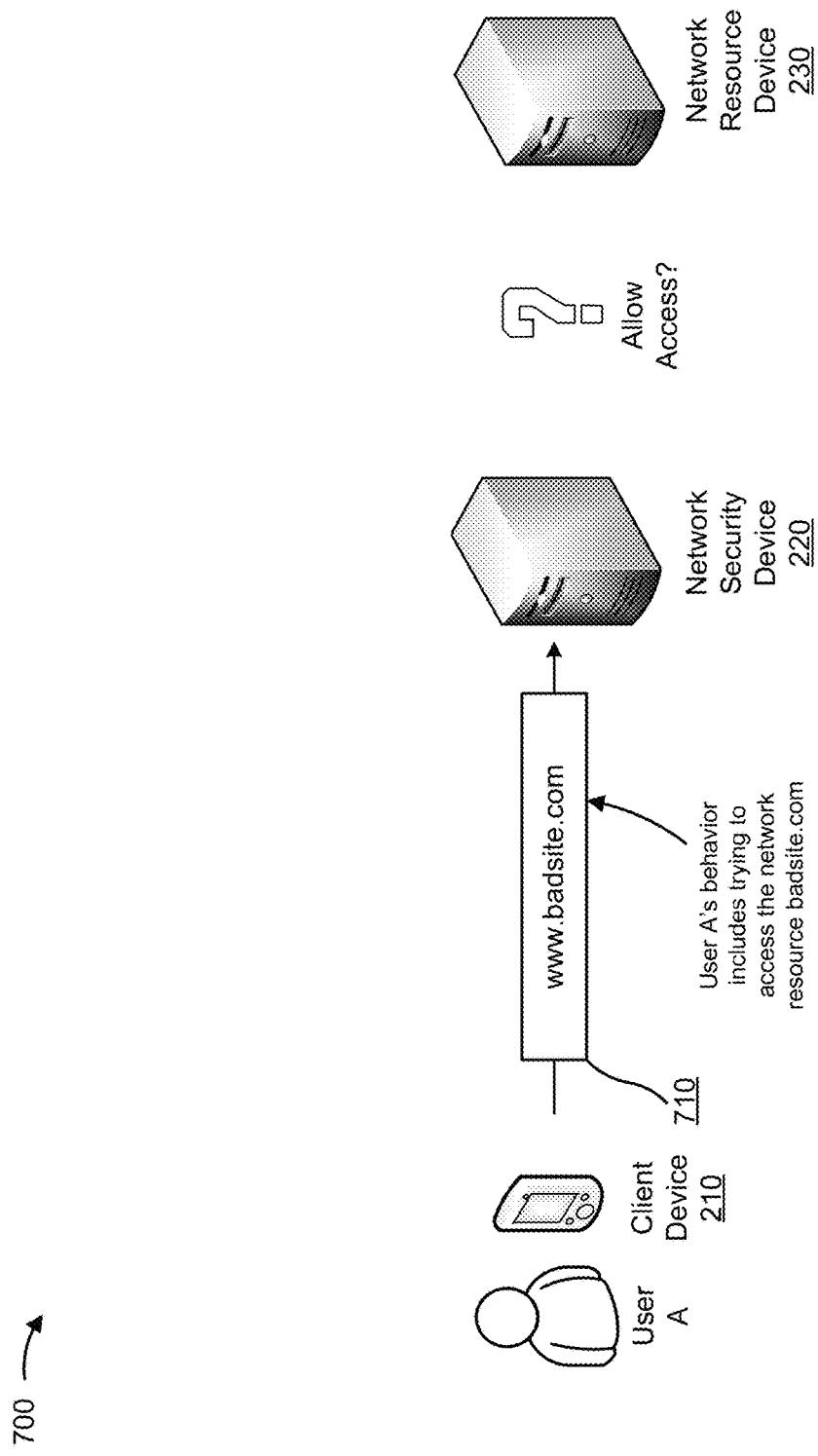
FIGS. 7A-7C are diagrams of an example implementation relating to the example process shown in FIG. 6.
Figure 7B:
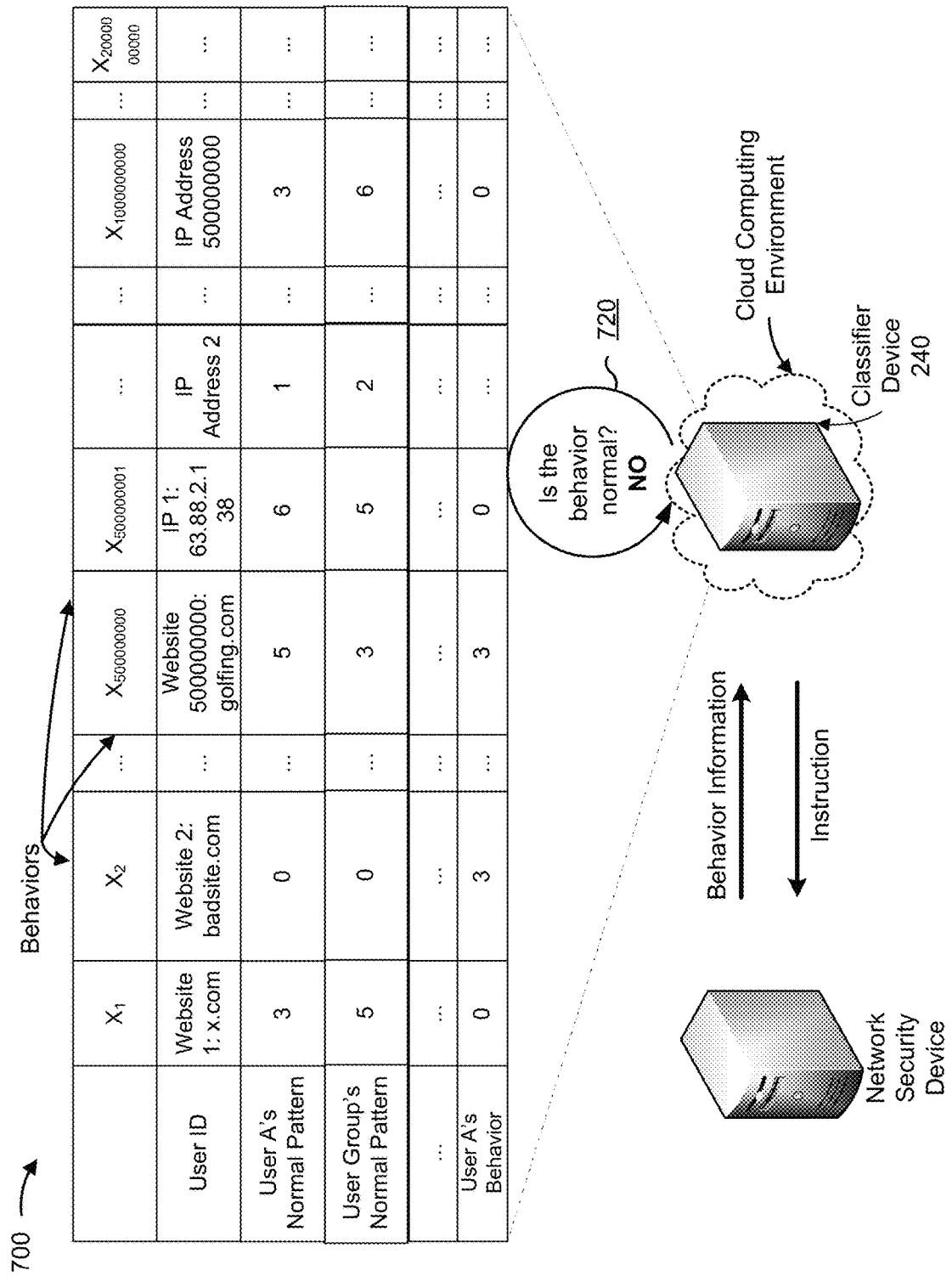
Figure 7C:
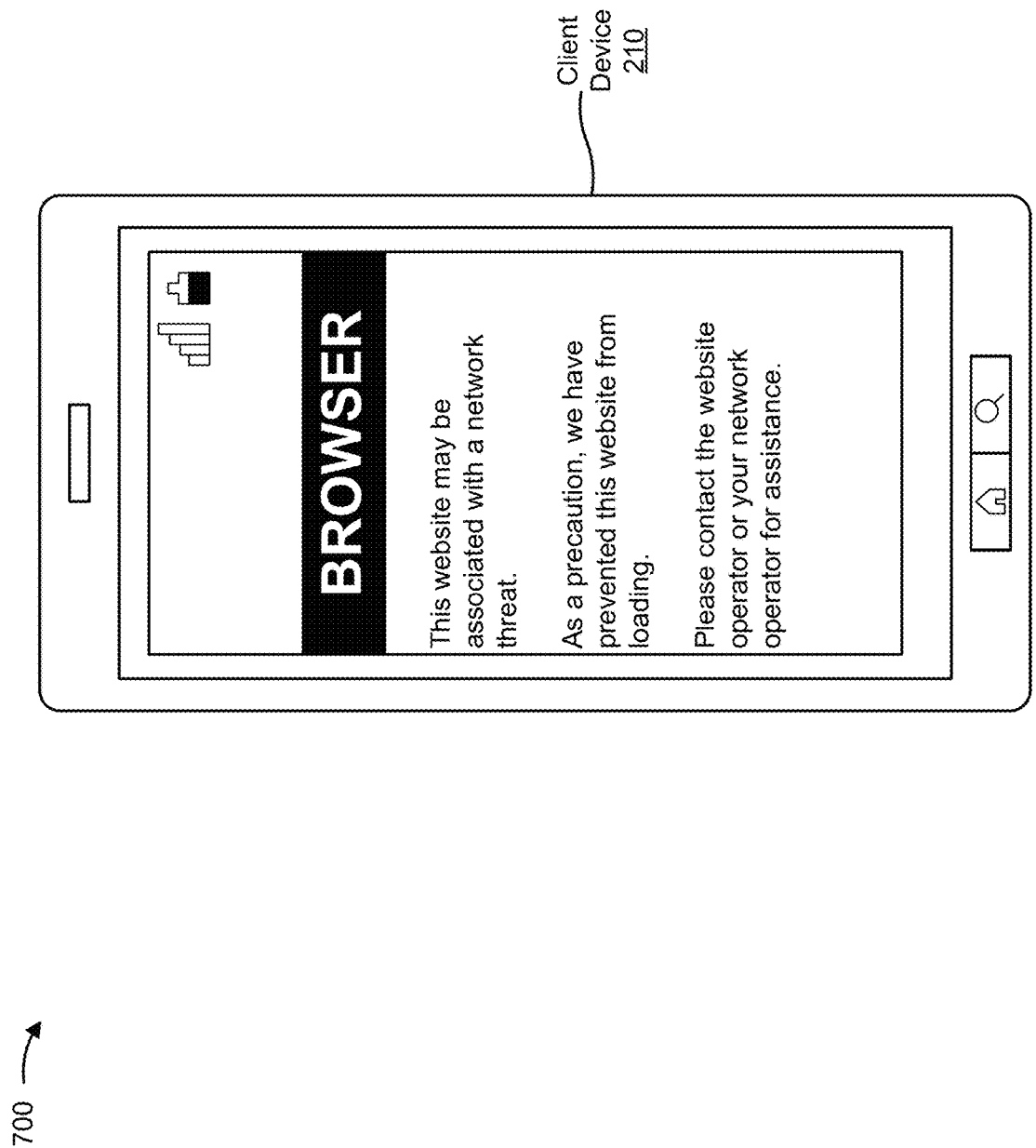

FIGS. 7A-7C are diagrams of an example implementation 700 relating to example process 600 shown in FIG. 6. FIGS. 7A-7C show an example of determining whether a user's behavior is normal and updating the model based on the user's behavior. Assume that example implementation 700 includes client device 210 (e.g., a smartphone being used by User A), network security device 220, network resource device 230, classifier device 240, and a data structure stored by classifier device 240. Assume further that classifier device 240 has created a model based on normal behavior parameters, behavior information associated with User A, and behavior information associated with users who belong to a user group. Assume that the model includes a normal behavior pattern associated with User A and a normal behavior pattern associated with the user group (e.g., User A is a member of the user group). Assume further that the normal behavior patterns are based on behavior information that includes hundreds of thousands or more behaviors of User A and other users of the user group.

As shown in FIG. 7A, client device 210 receives an input from a user (e.g., shown as User A). As shown by reference number 710, client device 210 sends a request to network security device 220 to access a network resource www-.badsite.com. Assume further that the user's client device 210 also sent two more requests to www.badsite.com and three requests to golfing.com. Three requests to access badsite.com and three requests to access golfing.com is a behavior associated with the user (e.g., during a certain time period). Network security device 220 receives behavior information that identifies the user and the behavior.

As shown in FIG. 7B, network security device 220 provides the behavior information to classifier device 240. As shown by reference number 720, classifier device 240 determines, based on the model (e.g., which includes User A's normal behavior pattern and the user group's normal behavior pattern, as shown in a data structure stored by classifier device 240), whether the behavior is normal. Classifier device 240 compares the behavior (e.g., shown as "User A's Behavior" in the data structure) to User A's normal behavior pattern and the user group's normal behavior pattern.

Classifier device 240 determines that a difference between User A's behavior and User A's normal behavior pattern satisfies a threshold. The threshold is satisfied because of a difference between a quantity of requests to badsite.com. User A's behavior includes three requests to badsite.com while User A's normal behavior pattern includes no requests to badsite.com (e.g., the difference between a quantity of requests to badsite.com is large enough to overshadow the similarities in requesting golfing.com; also, a greater weight may be applied to the difference between a quantity of requests to badsite.com than a difference between the quantity of requests to golfing.com). Classifier device 240 determines that User A's behavior is abnormal based on determining that the threshold is satisfied. Classifier device 240 monitors User A's behavior because User A's behavior has been classified as abnormal based on User A's normal behavior pattern (e.g., classifier device 240 may not have enough confidence in a determination of abnormality based on User A's normal behavior pattern and may need to perform more calculations before taking more action in relation to User A).

Classifier device 240 determines that User A is a member of a user group, such as a user group based on age or geography. Classifier device 240 determines that a difference between User A's behavior and the user group's normal behavior pattern satisfies a threshold. Classifier device 240 determines that User A's behavior is abnormal based on determining that the threshold is satisfied. Now, classifier device 240 may have more confidence in a determination of abnormality because it is based on the user group's normal behavior pattern and based on User A's normal behavior pattern.

As further shown, classifier device 240 provides an instruction to network security device 220 to deny client device 210 access to the network resource, in order to prevent malware from www.badsite.com from infecting client device 210 (e.g., the user is unaware of the danger posed by the website). Network security device 220 denies client device 210 access to the network resource (not shown). Classifier device 240 stores User A's behavior, which has been classified as abnormal, and may user User A's behavior to modify the model. In this way, classifier device 240 determines whether a user's behavior is normal and/or updates the model based on the user's behavior, in order to detect abnormal behavior with speed and accuracy.

As shown in FIG. 7C, client device 210 receives a message which indicates a network threat posed by the website and that notifies the user of an action performed by network security device 220 in order to neutralize the network threat posed by the website. As indicated by the message, network security device has prevented client device 210 from accessing the network resource.

As indicated above, FIGS. 7A-7C are provided merely as an example. Other examples are possible and may differ from what was described with regard to FIGS. 7A-7C.

Figure 8B:
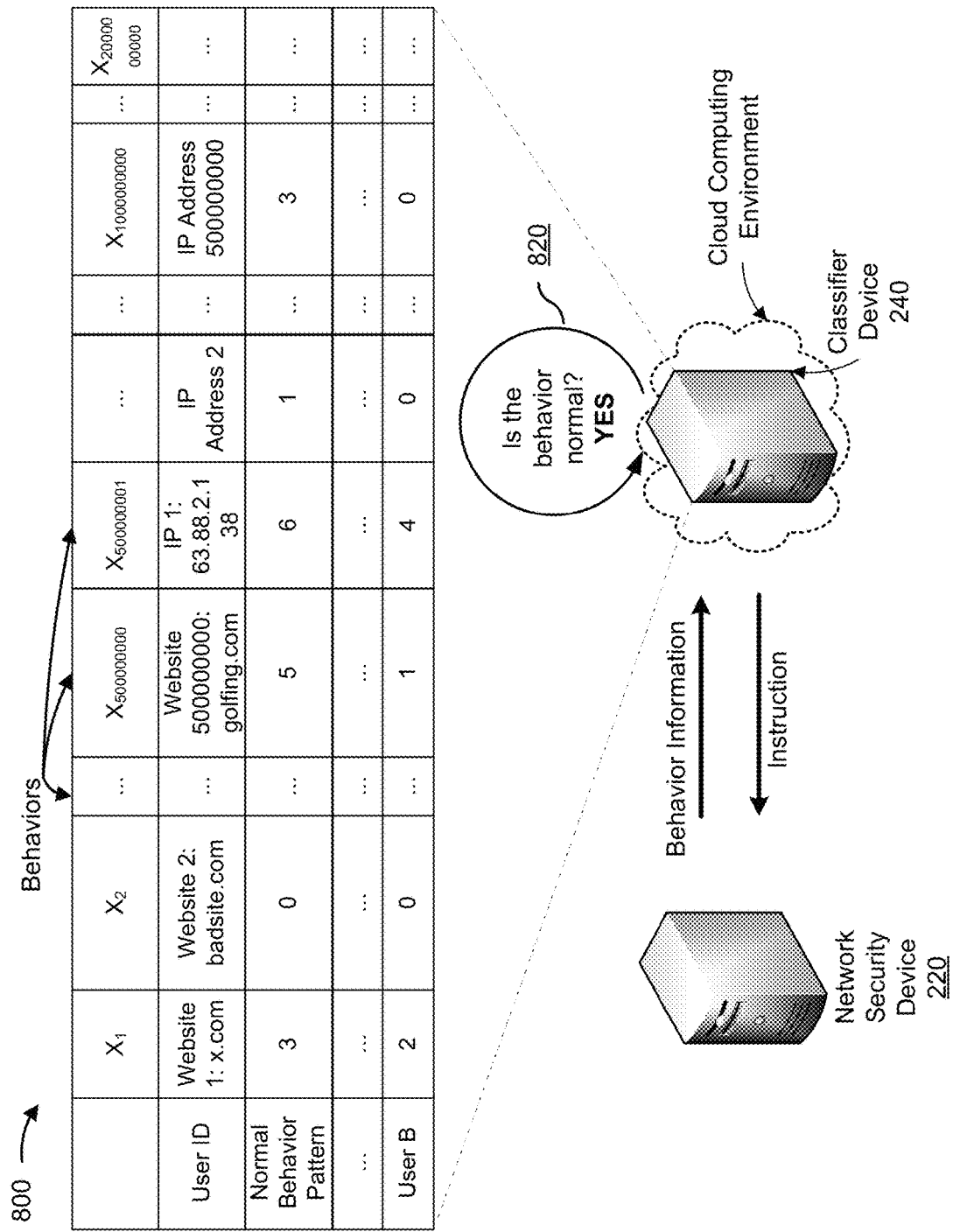
Figure 8C:
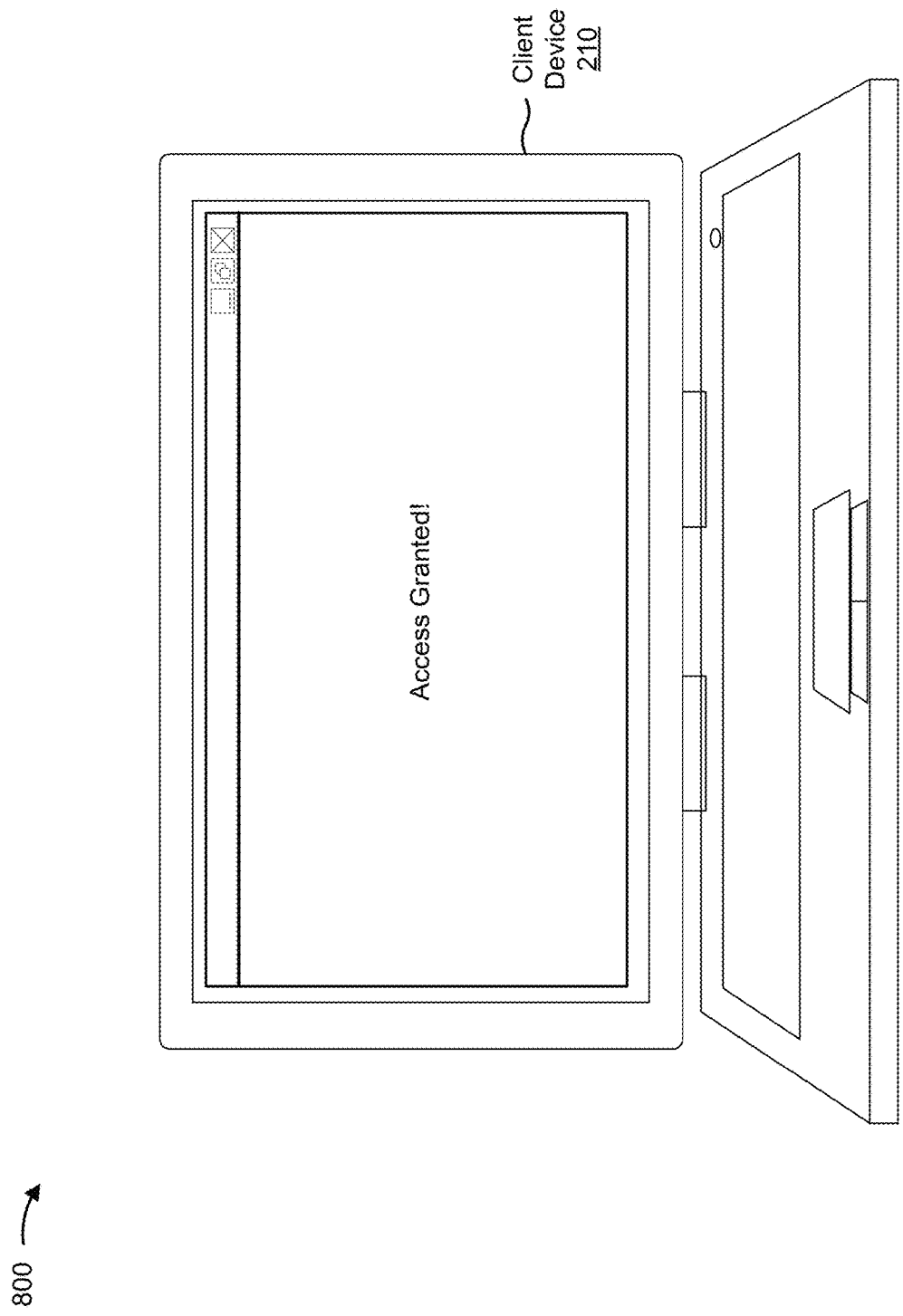

FIGS. 8A-8C are diagrams of an example implementation 800 relating to example process 600 shown in FIG. 6. FIGS. 8A-8C show an example of determining whether a user's behavior is normal and updating the model based on the user's behavior. Assume that example implementation 800 includes client device 210 (e.g., a laptop computer being used by User B), network security device 220, network resource device 230, classifier device 240, and a data structure stored by classifier device 240. Assume that classifier device 240 has not previously received behavior information associated with User B. Assume further that classifier device 240 has not created a model that includes User B's normal behavior pattern. Assume further that classifier device 240 has created a model, which includes a normal behavior pattern associated with all users for whom classifier device 240 has received behavior information. Assume further that the normal behavior pattern is based on behavior information of hundreds of thousands or more users.

As shown in FIG. 8A, client device 210 receives an input from User B (e.g., the user). As shown by reference number 810, client device 210 sends a request to network security device 220 to access a network resource associated with network resource device 230 identified by IP address "63.88.2.138." Assume further that client device 210 sends three more requests to the IP address, two requests to x.com and one request to golfing.com (e.g., during a certain time period). Four requests to the IP address, the two requests to x.com, and the one request to golfing.com are included in a behavior associated with the user. Network security device 220 receives behavior information that identifies the user and the behavior.

As shown in FIG. 8B, network security device 220 provides the behavior information to classifier device 240. As shown by reference number 820, classifier device 240 determines, based on the model (e.g., which includes the normal behavior pattern, as shown in a data structure stored by classifier device 240), whether the behavior is normal. Classifier device 240 compares the behavior to the normal behavior pattern.

Classifier device 240 determines that the behavior is normal because a difference between the user's behavior and the normal behavior pattern does not satisfy a threshold. The threshold is not satisfied because a difference between a quantity of requests for golfing.com is not adequate to overshadow the similarities in a quantity of requests for x.com and the IP address (e.g., assume that a lesser weight is applied to a difference between the quantity of requests for golfing.com than to a difference between the quantity of requests for x.com and the IP address).

As further shown, classifier device 240 provides an instruction to network security device 220 to grant client device 210 permission to access the network resource associated with the IP address, since there is no network threat. Network security device 220 grants client device 210 access to the network resource (not shown). In this way, classifier device 240 determines whether a user's behavior is normal and/or updates the model based on the user's behavior, in order to detect network threats with speed and accuracy.

As shown in FIG. 8C, client device 210 gains full access to the network resource associated with the IP address.

As indicated above, FIGS. 8A-8C are provided merely as an example. Other examples are possible and may differ from what was described with regard to FIGS. 8A-8C.

Figure 9:
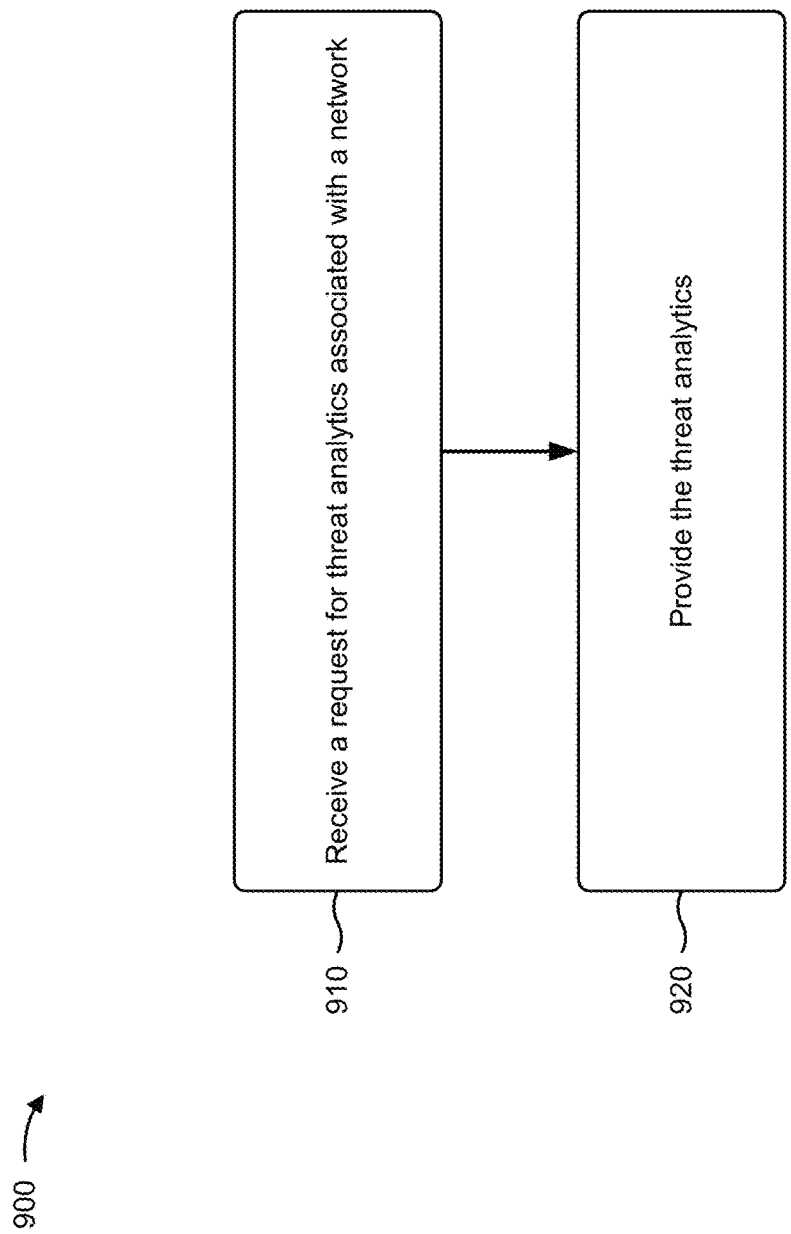
FIG. 9 is a flow chart of an example process for providing, upon request, threat analytics associated with a network.

FIG. 9 is a flow chart of an example process 900 for providing, upon request, threat analytics associated with a network. In some implementations, one or more process blocks of FIG. 9 may be performed by classifier device 240. In some implementations, one or more process blocks of FIG. 9 may be performed by another device or a set of devices separate from or including classifier device 240, such as network security device 220.

As shown in FIG. 9, process 900 may include receiving a request for threat analytics associated with a network (block 910). For example, classifier device 240 may receive a request for threat analytics associated with a network. The network may include one or more networks (e.g., network 250 and/or network 260) that may interconnect client devices 210 and/or network resource devices 230. In some implementations, a network operator may input the request for the threat analytics to a computing device (e.g., a desktop computer, a laptop, or the like), which may provide the request to classifier device 240. Additionally, or alternatively, the network operator may input a web address to a web browser of the computing device in order to request threat analytics from classifier device 240 (e.g., the web address may be associated with a portal or a dashboard that displays the threat analytics, with different web addresses associated with various parts of the threat analytics).

In some implementations, the network operator may input parameters associated with the request in order to specify a type of threat analytics. For example, the network operator may input a time period covered by the threat analytics (e.g., one minute, one hour, one day, one week, or the like), a quantity of top threats to display (top 5 threats, top 10 threats, or the like), a quantity of threat categories (e.g., such as viruses, trojan horses, or the like) to display (top 5 categories, top 10 categories, or the like), affected device statistics to display (device breakdown by operating system, manufacturer, device type, or the like), a specificity of infection path network (e.g., at the device level, at the company level, at the state level, at the country level, or the like) to display, or some other parameter.

As further shown in FIG. 9, process 900 may include providing the threat analytics (block 920). For example, classifier device 240 may provide, for display, the threat analytics to a computing device being used by the network operator. In such an example, the computing device may display the threat analytics on a user interface. In some implementations, the threat analytics may be represented graphically using bar graphs, line graphs, pie graphs, or the like, as a part of the portal or the dashboard. Additionally, or alternatively, the threat analytics may assist classifier device 240 and/or the network operator in performing an action to neutralize a potential threat (e.g., the threat analytics may assist the network operator in making security decisions).

In some implementations, the threat analytics may include an indication of total threats affecting the network and/or an indication of a change in the quantity of total threats. In some implementations, the threat analytics may include a list of top threats that includes threat name, a quantity of users impacted, percentage of users adversely impacted out of the quantity of users, or the like. Additionally, or alternatively, the threat analytics may include a breakdown of users impacted by a threat by an operating system of a user, a manufacturer of a device used by the user, a type of device, or the like.

Additionally, or alternatively, the threat analytics may include a list of top threat categories that includes a threat category, a quantity of users impacted, a percentage adversely impacted out of the quantity of users, or the like. Additionally, or alternatively, the threat analytics may include a breakdown of users impacted by a threat category by an operating system of a user, a manufacturer of a device used by the user, a type of device, or the like.

In some implementations, the threat analytics may include a line graph showing a real-time volume of events associated with threats (e.g., total quantity of attacks originating from all threats as a function of time) and/or a line graph showing a real-time volume of new threats.

In some implementations, the threat analytics may include a table of information associated with patient zero (e.g., a first device affected by malware or other network threat) that includes the identity of patient zero (e.g., by phone number, by name of user, by account number of user, etc.), a threat name, a quantity of users impacted until detection by classifier device 240, an infection method (e.g., IP address, SMS, or the like), a date and time of detection, a time to detect the threat (e.g., classifier device 240 took 110 days to detect a threat), or the like. Additionally, or alternatively, the threat analytics may include a map that shows a path of infection associated with a threat (e.g., by showing a series of affected users) and/or a graph that shows growth in a quantity of users impacted by a threat as a function of time. In this way, the threat analytics may assist the network operator in devoting resources to dangerous threats and/or quickly spreading threats, and may assist the network operator in detecting real-time patterns in threat behavior, thereby improving early detection of network threats.

Although FIG. 9 shows example blocks of process 900, in some implementations, process 900 may include additional blocks, fewer blocks, different blocks, or differently arranged blocks than those depicted in FIG. 9. Additionally, or alternatively, two or more of the blocks of process 900 may be performed in parallel.

FIGS. 10A-10D are diagrams of an example implementation 1000 relating to example process 900 shown in FIG. 9. FIGS. 10A-10D show an example of providing, upon request, threat analytics associated with a network. Assume that implementation 1000 includes a computing device being used by a network operator and classifier device 240. Assume that the network operator has input a request for the threat analytics to the computing device, which provides the request to the classifier device 240 (e.g., the request is in a form of inputting a web address to a web browser of the computing device, with a slightly different web address associated with each of the following: FIG. 10A, FIG. 10B, FIG. 10C, and FIG. 10D). Assume further that the network operator has input parameters associated with the request (e.g., details of the parameters input by the network operator are described separately with respect to each figure of FIG. 10A-10D). Assume further that the threat analytics, as shown in FIGS. 10A-10D, assist a network operator in performing an action to neutralize a network threat (e.g., the threat analytics may assist the network operator in making network security decisions).

Figure 10A:
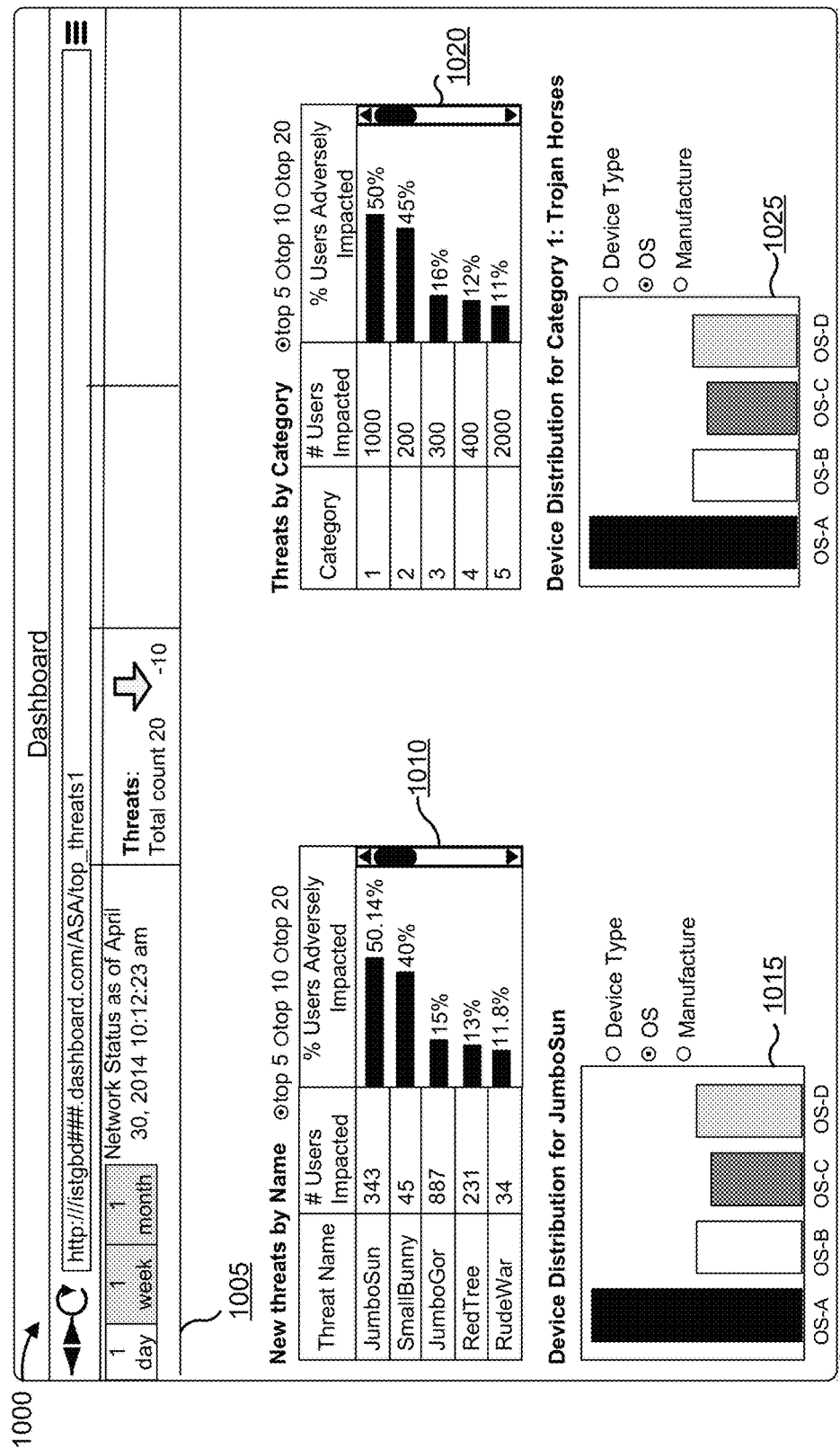
FIGS. 10A-10D are diagrams of an example implementation relating to the example process shown in FIG. 9.

As shown in FIG. 10A, classifier device 240 provides the threat analytics to a user interface of the computing device for display. As shown, the computing device displays a dashboard that includes the threat analytics. Assume that classifier device 240 received a parameter that indicated that the time period associated with the status bar is "1 day." As shown by reference number 1005, classifier device 240 may display a status bar that includes a time period covered by the threat analytics (e.g., the status bar shows "1 day" in highlight). As further shown, the status bar includes an indication of the date and time of generation of the threat analytics (e.g., shown as "network status as of . . . "). As further shown, the threat analytics include an indication of total threats affecting the network (e.g., shown as "Total count: 20") and/or an indication of a change in quantity of total threats (e.g., "−10," representing a decrease of 10).

Assume that classifier device 240 received a parameter that includes an instruction to display the top 5 new threats by name. As shown by reference number 1010, the threat analytics include a list of top threats that includes a threat name (e.g., JumboSun, SmallBunny, and so on), a quantity of users impacted (343, 45, and so on), and percentage adversely impacted out of the quantity of users (50.14%, 40%, and so on).

Assume that classifier device 240 received a parameter that includes an instruction to display a breakdown of operating systems of a device impacted by the threat. As shown by reference number 1015, the threat analytics include a breakdown of users impacted by JumboSun by an operating system used by a client device (e.g., different shades of gray and black represent different operating systems).

Assume that classifier device 240 received a parameter that includes an instruction to display the top 5 threat categories. As shown by reference number 1020, the threat analytics include a list of top threat categories that includes information that identifies the threat category (e.g., category 1 representing trojan horses, category 2 representing viruses, and so on), a quantity of users impacted (e.g., 1000, 200, and so on), and a percentage adversely impacted out of the quantity of users (e.g., 50%, 45%, and so on).

Assume that classifier device 240 received a parameter that includes an instruction to display a breakdown of devices impacted by trojan horses according to the operating system of client devices 210. As shown by reference number 1025, the threat analytics include a breakdown of users impacted by trojan horses by an operating system used by client devices 210 (e.g., different shades of gray and black represent different operating systems).

Figure 10B:
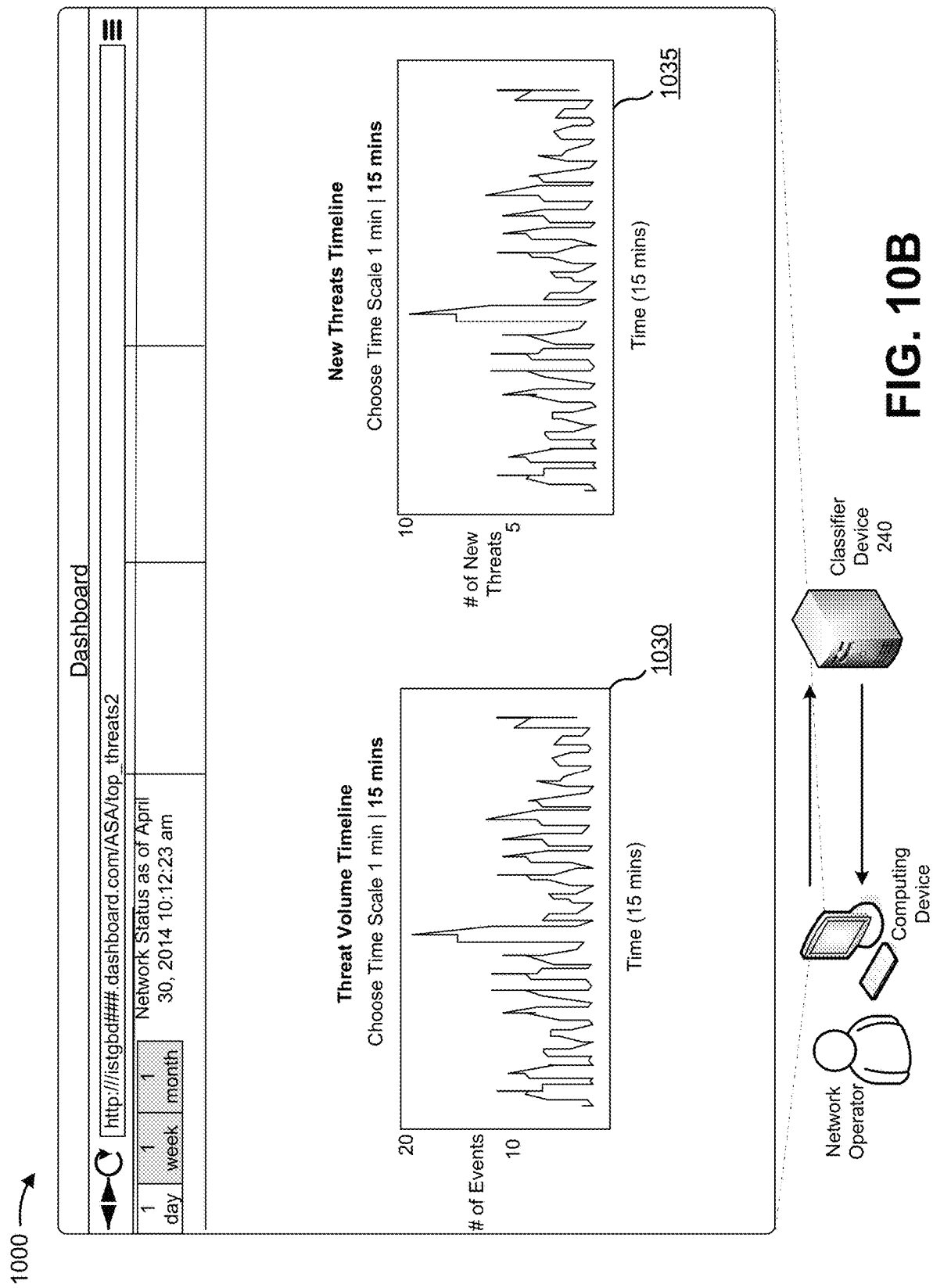

As shown in FIG. 10B, classifier device 240 provides the threat analytics to a user interface of the computing device for display. As shown, the computing device displays a dashboard that includes the threat analytics. Assume that parameters received by classifier device 240 included an instruction to display a volume of events during 15 minute time periods. As shown by reference number 1030, the threat analytics include a time line, in 15 minute increments, showing a real-time volume of events associated with threats (e.g., total quantity of attacks originating from all threats as a function of time). As shown by the time line, the number of events reached nearly 20 events at one point in the timeline.

Assume further that the parameters included an instruction to display the volume of new threats during 15 minute time periods. As shown by reference number 1035, the threat analytics include a timeline, in 15 minute increments, showing a real-time volume of new threats (e.g., quantity of new threats as a function of time). As shown by the timeline, the quantity of new threats reached nearly 10 at one point in the timeline.

Figure 10C:
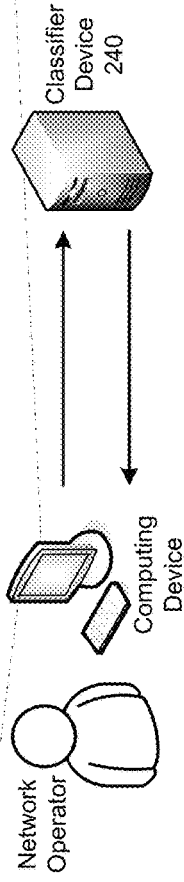

As shown in FIG. 10C, classifier device 240 provides the threat analytics to a user interface of the computing device for display. As shown, the computing device displays a dashboard that includes the threat analytics. As shown by reference number 1040, the threat analytics include a table that includes an identity of patient zero (e.g., (111) 111-1111, (222)-222-1111, and so on), a threat name (RedTree is a threat associated with (111) 111-1111, SmallBunny is a threat associated with (222) 222-1111, and so on), a quantity of users impacted until detection of the threat by classifier device 240 (e.g., 1000, 802, and so on), an infection method (e.g., IP address, SMS, and so on), and a date and time of detection of the threat (11-05-2013 03:11:32, 11-03-2014 01:11:45, and so on).

As shown by reference number 1045, the threat analytics include a table that includes a threat name (e.g., RedTree, SmallBunny, and so on), a time that classifier device 240 took to detect patient zero (e.g., 110 days, 95 days, and so on), a quantity of users impacted until detection of patient zero (e.g., 1000, 902, and so on), and a date and time of detection of patient zero (e.g., 11-08-2013 04:11:45, 12-01-2014 14:45:15, and so on).

Figure 10D:
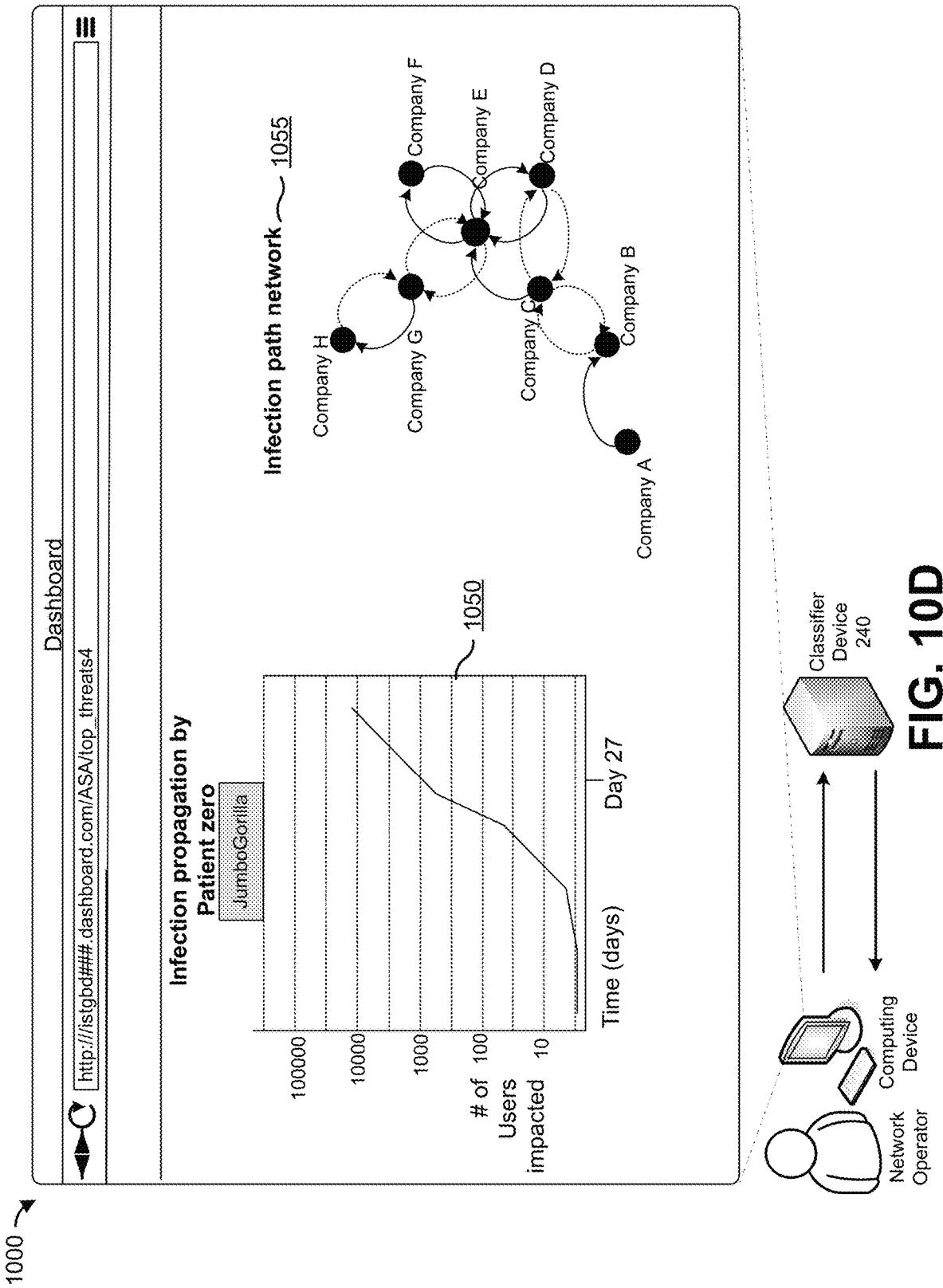

As shown in FIG. 10D, classifier device 240 provides the threat analytics to a user interface of the computing device for display. As shown, the computing device displays a dashboard that includes the threat analytics. As shown by reference number 1050, the threat analytics include a line graph of a number of users impacted by a threat (e.g., JumboGorilla) originating from a single patient zero as a function of time. As shown, the line graph indicates that the number of users impacted by JumboGorilla reached 1000 at approximately day 27.

As shown by reference number 1055, the threat analytics include a map that shows a path of infection associated with a threat (e.g., by showing a series of affected companies). A level of user specificity shown on the map is at firm or company level. The map shows a threat that originated at a device at company A (e.g., patient zero was at company A) and moved to infect company B, company C, and so on.

In this way, the threat analytics, as shown in FIG. 10A-10D, may assist the network operator in devoting resources to dangerous threats and/or quickly spreading threats, and may assist the network operator in detecting real-time patterns in threat behavior, thereby improving early detection of threats.

As indicated above, FIGS. 10A-10D are provided merely as an example. Other examples are possible and may differ from what was described with regard to FIGS. 10A-10D.

In this way, classifier device 240 may facilitate determining whether a user's behavior is normal using a model that is based on normal behavior information and/or abnormal behavior information, and/or may facilitate updating the model by using the user's behavior. Implementations described herein may improve network security by detecting and/or neutralizing network threats preemptively.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    receiving, by a device, behavior information that identifies a behavior associated with a user,
        the behavior including one or more requests, from a client device of the user, to access one or more network resources of a network;
    determining, by the device, whether a first model has been created,
        the first model, when created, including a first normal behavior pattern associated with the user;
    determining, by the device, whether a second model has been created,
        the second model, when created, including a second normal behavior pattern associated with a user group to which the user belongs;
    determining, by the device, whether the behavior is normal by selectively comparing, based on whether at least one of the first model or the second model has been created, the behavior information and at least one of the first normal behavior pattern or the second normal behavior pattern,
        the behavior information being input into the first model to compare the behavior information and the first normal behavior pattern when the first model has been created, and
        the behavior information being input into the second model to compare the behavior information and the second normal behavior pattern when the second model has been created;
    determining, by the device, that a comparison of the behavior information and the at least one of the first normal behavior pattern or the second normal behavior pattern does not provide a conclusive classification of whether the behavior is normal;
    comparing, by the device and based on the comparison of the behavior information and the at least one of the first normal behavior pattern or the second normal behavior pattern not being able to provide the conclusive classification of whether the behavior is normal, the behavior information and another normal behavior pattern;
    providing, by the device and based on comparing the normal behavior information and another normal behavior information to determine that the behavior is normal, an instruction to allow the client device to proceed with the behavior; and
    selectively:
        updating, by the device, when the first model has been created and when the behavior is determined to be normal, the first model by using the behavior information to modify the first normal behavior pattern, or
        updating, by the device, when the second model has been created and when the behavior is determined to be normal, the second model by using the behavior information to modify the second normal behavior pattern.

2. The method of claim 1, wherein the behavior information identifies the behavior being performed over a particular period of time.

3. The method of claim 1, wherein determining whether the behavior is normal comprises:
    determining whether a difference between the behavior information and at least one of the first normal behavior pattern or the second normal behavior pattern satisfies a threshold.

4. The method of claim 1, wherein determining whether the first model was created comprises:
    determining that the first model was not created; and
    wherein determining whether the second model was created comprises:
        determining, based on determining that the first model was not created, whether the second model was created.

5. The method of claim 1, further comprising:
    comparing the behavior information and the first normal behavior pattern;
    wherein determining that a comparison of the behavior information and the at least one of the first normal behavior pattern or the second normal behavior pattern does not provide a conclusive classification of whether the behavior is normal includes determining that a comparison of the behavior information and the first normal behavior pattern does not provide a conclusive classification of whether the behavior is normal;
    wherein comparing the behavior information and the other normal behavior pattern includes comparing, based on the comparison of the behavior information and the first normal behavior pattern not being able to provide the conclusive classification of whether the behavior is normal, the behavior information and the second normal behavior pattern; and
    wherein determining whether the behavior is normal comprises:
        determining whether the behavior is normal based on comparing the behavior information and the second normal behavior pattern.

6. The method of claim 5,
    wherein determining that a comparison of the behavior information and the at least one of the first normal behavior pattern or the second normal behavior pattern does not provide a conclusive classification of whether the behavior is normal includes determining that a comparison of the behavior information and the second normal behavior pattern does not provide the conclusive classification of whether the behavior is normal;
    wherein comparing the behavior information and the other normal behavior pattern includes comparing, based on determining that the comparison of the behavior information and the second normal behavior pattern does not provide the conclusive classification of whether the behavior is normal, the behavior information and a third normal behavior pattern associated with all users for whom the device has received corresponding behavior information; and
    wherein the method further comprises:
        determining whether the behavior is normal based on comparing the behavior information and the third normal behavior pattern.

7. The method of claim 1, wherein the behavior is first behavior;
wherein the instruction is a first instruction; and
wherein the method comprises:
determining that second behavior associated with the user is abnormal; and
providing a second instruction to deny permission to the client device to proceed with the second behavior.

8. A device, comprising:
one or more memories; and
one or more processors, implemented at least partially in hardware and communicatively coupled to the one or more memories, configured to:
receive behavior information that identifies a behavior associated with a user,
the behavior including one or more requests, from a client device of the user, to access one or more network resources of a network;
determine whether a first model has been created,
the first model, when created, including a first normal behavior pattern associated with the user;
determine whether a second model has been created,
the second model, when created, including a second normal behavior pattern associated with a user group to which the user belongs;
determine whether the behavior is normal by selectively comparing, based on whether at least one of the first model or the second model has been created, the behavior information and at least one of the first normal behavior pattern or the second normal behavior pattern,
the behavior information being input into the first model to compare the behavior information and the first normal behavior pattern when the first model has been created, and
the behavior information being input into the second model to compare the behavior information and the second normal behavior pattern when the second model has been created;
determine that a comparison of the behavior information and the at least one of the first normal behavior pattern or the second normal behavior pattern does not provide a conclusive classification of whether the behavior is normal;
compare, based on the comparison of the behavior information and the at least one of the first normal behavior pattern or the second normal behavior pattern not being able to provide the conclusive classification of whether the behavior is normal, the behavior information and another normal behavior pattern;
provide, based on comparing the normal behavior information and another normal behavior information to determine that the behavior is normal, an instruction to allow the client device to proceed with the behavior; and
selectively:
update when the first model has been created and when the behavior is determined to be normal, the first model by using the behavior information to modify the first normal behavior pattern, or
update when the second model has been created and when the behavior is determined to be normal, the second model by using the behavior information to modify the second normal behavior pattern.

9. The device of claim 8, wherein the behavior information identifies the behavior being performed over a particular period of time.

10. The device of claim 8, wherein the one or more processors, when determining whether the behavior is normal, are configured to:
determine whether a difference between the behavior information and at least one of the first normal behavior pattern or the second normal behavior pattern satisfies a threshold.

11. The device of claim 8, wherein the one or more processors, when determining whether the first model was created, are configured to:
determine that the first model was not created; and
wherein the one or more processors, when determining whether the second model was created, are configured to:
determine, based on determining that the first model was not created, whether the second model was created.

12. The device of claim 8, wherein the one or more processors are further configured to:
compare the behavior information and the first normal behavior pattern;
wherein the one or more processors, when determining that a comparison of the behavior information and the at least one of the first normal behavior pattern or the second normal behavior pattern does not provide a conclusive classification of whether the behavior is normal, are configured to determine that a comparison of the behavior information and the first normal behavior pattern does not provide a conclusive classification of whether the behavior is normal;
wherein the one or more processors, when comparing the behavior information and the other normal behavior pattern, are configured to compare, based on the comparison of the behavior information and the first normal behavior pattern not being able to provide the conclusive classification of whether the behavior is normal, the behavior information and the second normal behavior pattern; and
wherein the one or more processors, when determining whether the behavior is normal, are configured to:
determine whether the behavior is normal based on comparing the behavior information and the second normal behavior pattern.

13. The device of claim 12,
wherein the one or more processors, when determining that a comparison of the behavior information and the at least one of the first normal behavior pattern or the second normal behavior pattern does not provide a conclusive classification of whether the behavior is normal, are configured to determine that a comparison of the behavior information and the second normal behavior pattern does not provide the conclusive classification of whether the behavior is normal;
wherein the one or more processors, when comparing the behavior information and the other normal behavior pattern, are configured to compare, based on determining that the comparison of the behavior information and the second normal behavior pattern does not provide the conclusive classification of whether the behavior is normal, the behavior information and a third normal behavior pattern associated with all users for whom the device has received corresponding behavior information; and wherein the one or more processors are further configured to:
determine whether the behavior is normal based on comparing the behavior information and the third normal behavior pattern.

14. The device of claim 8, wherein the behavior is first behavior;
wherein the instruction is a first instruction; and
wherein the one or more processors are further configured to:
determine that second behavior associated with the user is abnormal; and
provide a second instruction to deny permission to the client device to proceed with the second behavior.

15. A non-transitory computer-readable medium storing instructions, the instructions comprising:
one or more instructions that, when executed by one or more processors, cause the one or more processors to:
receive behavior information that identifies a behavior associated with a user,
the behavior including one or more requests, from a client device of the user, to access one or more network resources of a network;
determine whether a first model has been created,
the first model, when created, including a first normal behavior pattern associated with the user;
determine whether a second model has been created,
the second model, when created, including a second normal behavior pattern associated with a user group to which the user belongs;
determine whether the behavior is normal by selectively comparing, based on whether at least one of the first model or the second model has been created, the behavior information and at least one of the first normal behavior pattern or the second normal behavior pattern,
the behavior information being input into the first model to compare the behavior information and the first normal behavior pattern when the first model has been created, and
the behavior information being input into the second model to compare the behavior information and the second normal behavior pattern when the second model has been created;
determine that a comparison of the behavior information and the at least one of the first normal behavior pattern or the second normal behavior pattern does not provide a conclusive classification of whether the behavior is normal;
compare, based on the comparison of the behavior information and the at least one of the first normal behavior pattern or the second normal behavior pattern not being able to provide the conclusive classification of whether the behavior is normal, the behavior information and another normal behavior pattern;
provide, based on comparing the normal behavior information and another normal behavior information to determine that the behavior is normal, an instruction to allow the client device to proceed with the behavior; and
selectively:
update when the first model has been created and when the behavior is determined to be normal, the first model by using the behavior information to modify the first normal behavior pattern, or
update when the second model has been created and when the behavior is determined to be normal, the second model by using the behavior information to modify the second normal behavior pattern.

16. The non-transitory computer-readable medium of claim 15, wherein the behavior information identifies the behavior being performed over a particular period of time.

17. The non-transitory computer-readable medium of claim 15, wherein the one or more instructions, that cause the one or more processors to determine whether the behavior is normal, cause the one or more processors to:
determine whether a difference between the behavior information and at least one of the first normal behavior pattern or the second normal behavior pattern satisfies a threshold.

18. The non-transitory computer-readable medium of claim 15, wherein the one or more instructions, that cause the one or more processors to determine whether the first model was created, cause the one or more processors to:
determine that the first model was not created; and
wherein the one or more instructions, that cause the one or more processors to determine whether the second model was created, cause the one or more processors to:
determine, based on determining that the first model was not created, whether the second model was created.

19. The non-transitory computer-readable medium of claim 15, wherein the one or more instructions, when executed by the one or more processors, further cause the one or more processors to:
compare the behavior information and the first normal behavior pattern;
wherein the one or more instructions, that cause the one or more processors to determine that a comparison of the behavior information and the at least one of the first normal behavior pattern or the second normal behavior pattern does not provide a conclusive classification of whether the behavior is normal, cause the one or more processors to determine that a comparison of the behavior information and the first normal behavior pattern does not provide a conclusive classification of whether the behavior is normal;
wherein the one or more instructions, that cause the one or more processors to compare the behavior information and the other normal behavior pattern, cause the one or more processors to compare, based on the comparison of the behavior information and the first normal behavior pattern not being able to provide the conclusive classification of whether the behavior is normal, the behavior information and the second normal behavior pattern; and
wherein the one or more instructions, that cause the one or more processors to determine whether the behavior is normal, cause the one or more processors to:
determine whether the behavior is normal based on comparing the behavior information and the second normal behavior pattern.

20. The non-transitory computer-readable medium of claim 19,
wherein the one or more instructions, that cause the one or more processors to determine that a comparison of the behavior information and the at least one of the first normal behavior pattern or the second normal behavior pattern does not provide a conclusive classification of whether the behavior is normal, cause the one or more processors to determine that a comparison of the behavior information and the second normal behavior pattern does not provide the conclusive classification of whether the behavior is normal;
wherein the one or more instructions, that cause the one or more processors to compare the behavior information and the other normal behavior pattern, cause the one or more processors to compare, based on determining that the comparison of the behavior information and the second normal behavior pattern does not provide the conclusive classification of whether the behavior is normal, the behavior information and a third normal behavior pattern associated with all users for whom the device has received corresponding behavior information; and
wherein the one or more instructions, when executed by the one or more processors, further cause the one or more processors to:
  determine whether the behavior is normal based on comparing the behavior information and the third normal behavior pattern.

* * * * *